US008645270B2

(12) United States Patent
Mallean et al.

(10) Patent No.: US 8,645,270 B2
(45) Date of Patent: Feb. 4, 2014

(54) ENHANCED CUSTOMER INTERACTION CHANNEL SYSTEMS AND METHODS

(71) Applicant: PayClip, LLC

(72) Inventors: Sean H. Mallean, Alpharetta, GA (US); Henry G. Mallean, Woodland Hills, CA (US); Clark S. Gilder, Alpharetta, GA (US)

(73) Assignee: Paynection, Atlanta, GA (US)

( * ) Notice: Subject to any disclaimer, the term of this patent is extended or adjusted under 35 U.S.C. 154(b) by 0 days.

(21) Appl. No.: 13/659,342

(22) Filed: Oct. 24, 2012

(65) Prior Publication Data

US 2013/0103578 A1 Apr. 25, 2013

Related U.S. Application Data

(60) Provisional application No. 61/550,900, filed on Oct. 24, 2011.

(51) Int. Cl.
*G06Q 40/00* (2012.01)
(52) U.S. Cl.
USPC .............................................. 705/39; 705/30
(58) Field of Classification Search
USPC ...................................................... 705/10–44
See application file for complete search history.

(56) References Cited

U.S. PATENT DOCUMENTS

| | | | |
|---|---|---|---|
| 6,324,525 B1 * | 11/2001 | Kramer et al. ................... | 705/40 |
| 6,999,943 B1 * | 2/2006 | Johnson et al. .................. | 705/39 |
| 7,124,101 B1 * | 10/2006 | Mikurak ........................... | 705/35 |
| 7,539,646 B2 | 5/2009 | Gilder et al. | |
| 7,620,603 B2 | 11/2009 | Gilder et al. | |
| 7,702,588 B2 | 4/2010 | Gilder et al. | |
| 7,797,235 B2 * | 9/2010 | German et al. .................. | 705/39 |
| 7,908,170 B2 | 3/2011 | Asmar et al. | |
| 8,024,267 B2 | 9/2011 | Olliphant et al. | |
| 8,028,041 B2 | 9/2011 | Olliphant et al. | |
| 8,175,908 B1 | 5/2012 | Anderson | |
| 2002/0087409 A1 | 7/2002 | Joao | |
| 2007/0136192 A1 * | 6/2007 | German et al. .................. | 705/40 |
| 2007/0288312 A1 | 12/2007 | Wang | |
| 2008/0103912 A1 | 5/2008 | Naccache | |
| 2008/0247629 A1 | 10/2008 | Gilder | |
| 2008/0249931 A1 | 10/2008 | Gilder | |
| 2008/0249951 A1 | 10/2008 | Gilder | |
| 2008/0283590 A1 * | 11/2008 | Oder et al. ..................... | 235/380 |
| 2009/0094148 A1 | 4/2009 | Gilder | |
| 2010/0063874 A1 | 3/2010 | Keithley et al. | |
| 2010/0161466 A1 | 6/2010 | Gilder | |
| 2010/0174596 A1 | 7/2010 | Gilman et al. | |
| 2011/0022628 A1 | 1/2011 | Kramer et al. | |
| 2011/0035278 A1 | 2/2011 | Fordyce, III et al. | |
| 2011/0125638 A1 * | 5/2011 | Davis et al. ..................... | 705/41 |
| 2011/0137803 A1 * | 6/2011 | Willins ........................... | 705/67 |
| 2012/0084135 A1 | 4/2012 | Nissan et al. | |

* cited by examiner

*Primary Examiner* — Frantzy Poinvil
(74) *Attorney, Agent, or Firm* — Clements Bernard PLLC; Lawrence A. Baratta, Jr.; Christopher L. Bernard

(57) ABSTRACT

A computer-implemented method, a server, and a computer use an enhanced customer interaction channel based on a predetermined payment key associated with a specific company and location. The predetermined payment key uniquely identifies the specific company and location and enables the enhanced customer interaction channel based on existing payment processing systems. The specific company may use the enhanced customer interaction channel to reach customers who were previously unknown to the specific company for a variety of purposes such as rewards, coupons, offers, product information, and the like.

17 Claims, 18 Drawing Sheets

ENHANCED CUSTOMER INTERACTION CHANNEL SYSTEMS AND METHODS

CROSS-REFERENCE TO RELATED APPLICATION(S)

The present non-provisional patent application/patent claims the benefit of priority of co-pending U.S. Provisional Patent Application No. 61/550,900, filed on Oct. 24, 2011, and entitled "LINKING COMPANY AND RECEIPT DATA WITH PAYMENT TRANSACTIONS," the contents of which are incorporated in full by reference herein.

FIELD OF THE INVENTION

Generally, the field of art of the present disclosure pertains to payment systems and methods, and more particularly, to an enhanced customer interaction channel where the identity of the customer may or may not be known before a payment transaction begins and without prior acceptance, opt-in or participation of the customer with a merchant or seller desiring to utilize the channel.

BACKGROUND OF THE INVENTION

There exists a great deal of knowledge, experience, data and operational experience in the prior art surrounding the field generally known as electronic payment transaction processing and the corresponding systems and methods that operate the various electronic payment networks. Exemplary payment transactions systems include well-known brands such as Visa, MasterCard, Discover, American Express (a.k.a Amex), and other networks such as the Automated Clearinghouse (ACH) system operated by the National Automated Clearinghouse Association (NACHA), paper check and check image processing system, coupon redemption systems, customer loyalty or reward (aka 'points') systems and the like. Traditionally, these systems are intended to efficiently and securely facilitate the transfer of monetary value from a buyer to a seller who provided a product, good, or service to the buyer for the agreed upon value amount. Typically the buyer and seller (or customer, business, or other entity relationship) have utilized a variety of electronic transaction processing methods, electronic messages, electronic data formats, machine formats and the like to accomplish the value or payment transfer and then typically they utilize a second separate system to deliver the physical or digital item, good, or service to the buyer. Thus, these electronic payment transaction processing systems do not facilitate the transfer of knowledge about the customer to the buyer and instead focus on monetary accuracy, speed, reliability, and being a guaranteed source of known good funds.

However, to facilitate future sales or to enhance existing or future transactions between a buyer and the seller, it would be advantageous for the seller to know how to reach customers via a known good transaction information channel which exists outside of the payment or value transfer systems. Historically, sellers reached out or communicated to prospective customers via advertising and marketing systems and methods which are separate from and distinct from the payment processing channels or systems. Thus to drive sales and increase business, a seller or company must know how to "reach" their existing customers or utilize broad reach mass market advertising and sales methods with unsure or unproven results in terms of effectiveness in reaching the desired or targeted customer. This fact may be mitigated when companies or sellers utilize channels which are based on personally identifiable data provided by their existing or previous customers during a prior transaction. Systems which are based on voluntary, personal or identifiable customer data or knowledge that was gathered provided or agreed to by a customer during or after previous transactions are generally considered or known as rewards programs or loyalty programs. These reward programs are seen as valuable by customers who wish to make repeat purchases from the same seller or company and historically companies utilize these systems to track existing customer behavior, patterns, preferences and general statistical knowledge about their customers for use in planning future sales, marketing or various other business methods, goals or objectives. Even with these existing "loyalty or reward" type systems and methods, sellers or companies who wish to reach their previous customers must depend on personally identifiable data which has provided by the customer under a voluntary or "opt-in" process. Typically this information is provided by their customer during previous sales transactions which may or not be provided to the company or seller during the payment transaction processing method used at the time of their prior purchase. Disadvantageously, "loyalty or reward" type systems and methods require voluntary participation from previous customers and are not able to target new customers and those customers who "opt-out."

Based on the foregoing, it would be advantageous to have a new type of engagement channel which could enhance the type, level and amount of communication and data exchange between customers/buyers and sellers/companies. Such a new type of channel would overcome the unsure or unproven results associated with broad reach mass market advertising and sales methods and the limited audience reach associated with "loyalty or reward" type systems and methods. Designing and developing a new engagement channel or system requires overcoming the errors, limitations or weaknesses of prior art, systems or methods which may have attempted similar results but failed to achieve them given their inability to deal with the unpredictable and widely varying set of data elements that may be produced by the various transaction processing systems as well as the location of these systems within the payment transaction processing marketplace or the scope or reach of these systems not being universal such as the present invention.

There are existing business methods, patents or applications that are known to those in the industry which attempt to do similar sounding but different aspects of processing, matching, inspecting, sorting, organizing data and the like from customer and company transaction or payment data. Some of the more notable of these prior art inventions will be described herein in order to clearly differentiate the current invention from their similar sounding names, concepts or ideas. None of these existing or known systems or methods should be inferred to teach, suggest or make obvious any of the current inventions novel or key aspects, ideas and inventive steps or elements.

US Patent Publication Number 2011/0022628, "Matching Merchant Names from Transaction Data", application Ser. No. 12/900,261 by Kramer. The Kramer reference describes a computer system process to determine a "matched merchant name" from transaction data. This method requires and depends on a previously "processed merchant name" from a "retrieved merchant name" in order to match the processed merchant name to one of a collection of "standard merchant names". Further, it declares that "at least one character of the retrieved merchant name may be altered to obtain the processed merchant name"—for example characters may be deleted or ignored to make a match. Some of the key deficiencies of the Kramer reference include:

1. The system described by Kramer relies on the fact that the merchant name retrieved from the payment data is used to derive the "standard merchant name", which is then associated with indicia information. For instance, the Kramer reference could derive "ABC" from the merchant name of "ABC Store 100" which was retrieved from a set of transaction data because the merchant name retrieved from the transaction data includes a minimum match on "ABC". However, this prior art would not be able to find a match or derive a standard merchant name if the merchant name used in the transaction data was "12345" since it does not have any portion of ABC in it.
2. The Kramer reference does not contemplate or include the ability to identify specific merchant locations from transaction data but simply the broadest level of "merchant" name. In fact, the Kramer reference specifically disregards location specific information, such as the store number, in order to derive a "standard merchant name".
3. The Kramer reference does not contemplate or include the ability to identify specific devices used during transactions.
4. The Kramer reference does not contemplate or include the ability to associate categories with retrieved merchant name.
5. The Kramer reference does not contemplate or include the ability to include Transaction Data or Customer receipt data as part of the indicia.
6. The Kramer reference does not contemplate or include the ability to use an actual payment (i.e., Company Payment) to link a Merchant Name and other data with a specific Company.
7. The Kramer reference does not contemplate or include the ability to use Merchant Data from an Acquirer to identify and link Merchant Name with a Company.
8. The Kramer reference does not contemplate or include the ability to link Product Data, such as user manuals and warranties, based on Product purchases as part of a Transaction.
9. The Kramer reference does not contemplate or include the ability to define and process Rewards.
10. The Kramer reference does not contemplate or include the ability to validate and process a Coupon or other type of marketing offer.
11. The Kramer reference does not contemplate or include the ability to enrich indicia information.
12. The Kramer reference does not contemplate or include the ability to share indicia information outside the system.
13. The Kramer reference has a limited operating position within the transaction or payment eco-system and thus cannot operate at the scope or level of the present inventions. For example, the system described in Kramer does not contemplate operating on data from outside of a single card issuer operational or transactional perspective. That is, the scope of its claims limit the matching to data from a single card issuer and it cannot operate across issuers, acquirers, merchants, third party reward systems and the like, thus its scope and applicability are limited and cannot operate in a manner or at a level as needed.

Additionally, another conventional solution includes U.S. Pat. No. 7,908,170 by Asmar titled "System and Method for Facilitating Commercial Transactions" which provides a system that "provides vital marketing information to participating merchants and purchasing records to customers while offering the most efficient and effective system to deliver the best terms and conditions for the products and services requested by customers". Note that this system does not contemplate matching Merchant Names or IDs to transaction data nor does it provide the other embodiments or features as it depends on real-time approval of a transaction at checkout. Another element of the prior art is US2012/0084135 (application Ser. No. 12/896,442) by Nissan titled "System and Method for Tracking Transaction Records in a Network" which provides a system for "processing a transaction record of a transaction between a merchant and a user". This system updates Customer records based on specified and well defined terminals which enable the processing of transaction sales data by Merchants who participate in the "network" provided by this invention. Note that this method again requires real-time participation in the "checkout" transaction by specified hardware or terminals that connect to a proprietary network. This method cannot work with data generated outside of the network nor can it work with data after the fact as may be enabled by a Customer statement provider. Finally, there is US2008/0103912 (application Ser. No. 11/924,323) by Naccache which describes a "Method of Providing Transaction Data, Terminal, Transaction Method, Method of Enhancing Bank Statements, Server, Signals and Computer Program Products Corresponding Thereto" which as the name implies requires a specialized terminal or device to generate enhanced data for statements such as pictures or images. The method provides "for each transaction a statement line containing at least one reference" for a specified transaction with the image being provided of the merchant store exterior, location and or item purchased. This system cannot work with Transaction data generated by outside systems and methods nor can it provide the other benefits.

As it can be seen by those of ordinary skill in the art, these existing systems, methods and well known prior art do not utilize the unique method to identify Customers based on known Company identifiers based on transaction data. Additionally, these existing systems cannot provide the same level of interaction with customers whether they are known or unknown and they cannot create the interactive and real-time Customer interaction or engagement channel.

BRIEF SUMMARY OF THE INVENTION

In an exemplary embodiment, a computer-implemented method includes determining a payment key associated with a specific company, location and device, wherein the payment key includes one or more attributes of Payment Data, Company Payment Data or Merchant Data, either in a native form or in a derivative form, that is configured to uniquely identify the specific company, location and device; determining transaction data matches the payment key thereby indicating a customer had a transaction with the specific company at the location; creating an engagement channel between the customer and the specific company based on the matching of the transaction data and the payment key; and providing unique or enhanced data to the customer by the specific company through the engagement channel, wherein the data includes one of data related to a transaction associated with the transaction data and or data related to a future transaction In another exemplary embodiment, a server includes a network interface communicatively coupled to at least one customer and at least one company; a processor communicatively coupled to the network interface; and memory storing instructions that, when executed, cause the processor to: register a specific company and location; derive a payment key associated with the specific company and location, wherein the payment key includes one or more attributes of Payment Data, Company Payment Data or Merchant Data, either in a native form or in a derivative form, that is configured to uniquely identify the specific company and the location; receive an indication from a customer that transaction data matches the payment key thereby indicating the customer had a transaction with the specific company at the location; create an engagement channel between the customer and the specific company based on the matching of the transaction data and the payment key; provide data to the customer by the specific company through the engagement channel, wherein the data includes one of data related to a transaction associated with the transaction data and or data related to a future transaction.

In yet another exemplary embodiment, a computer includes a network interface communicatively coupled to a server on a network; a processor communicatively coupled to the network interface; and memory storing instructions that, when executed, cause the processor to: execute an application or browser add-in; display transaction data associated with a transaction between a customer and a specific company and location; match the transaction data to a predetermined payment key, wherein the predetermined payment key includes one or more attributes of Payment Data, Company Payment Data or Merchant Data, either in a native form or in a derivative form, that is configured to uniquely identify the specific company and the location; display an engagement channel between the specific company and the customer; and provide data to the customer from the specific company through the engagement channel, wherein the data includes one of data related to a transaction associated with the transaction data and or data related to a future transaction.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

Figure 1:
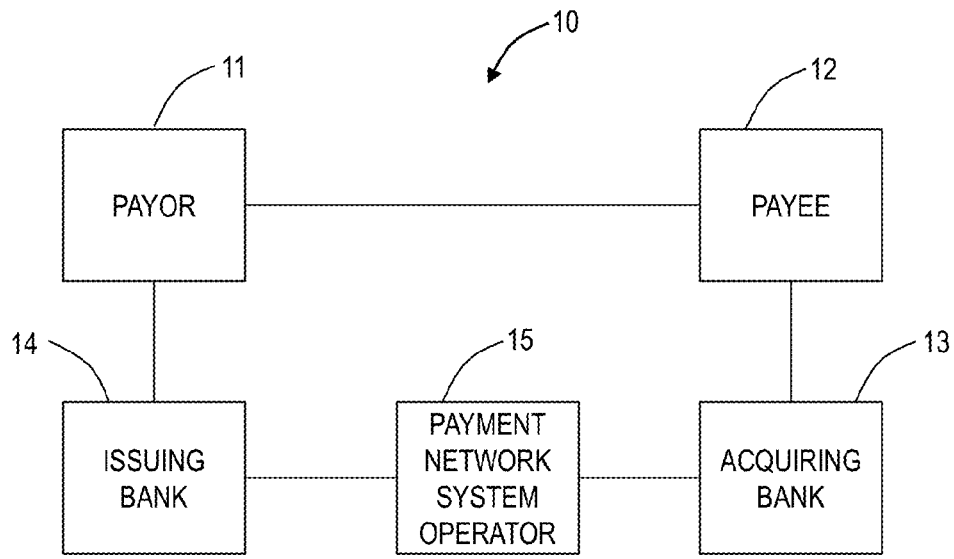
FIG. 1 is a diagram of an electronic payment processing network.

In various exemplary embodiments, an enhanced customer interaction channel is described where the identity of the Customer may or may not be known before the Transaction begins and without prior acceptance, opt-in or participation of the Customer with a Company or seller desiring to utilize the channel. The systems and methods describe the ability to match Customer transactions to Companies or merchants utilizing the system to continue and enhance their interaction with their existing Customers as well as prospective or unknown Customers. Various embodiments describe how this new "customer—seller interaction channel" or engagement channel may be utilized and extended by Companies to enhance their interactions with Customers beyond the transaction value used to create the original match or transaction entity.

Thus the creation of a new type of channel which could enhance the type, level and amount of communication and data exchange between Customers/buyers and Companies/sellers would be desirable in the broadest economic sense to enhance all transactions and sales efforts both past, present and future Customer interactions, sales, support, education and the similar efforts. This new type of customer engagement channel is novel and unique in particular because this channel can be used by Companies/sellers to reach Customers/buyers, whether they are existing/prior customer or new/unknown Customers and without requiring prior presentment of personally identifiable data by the Customer/buyer to the system operating the new channel or to the Company/seller. Further, it would be more desirable that this new information, data, communication and value transfer or exchange system could be generated automatically using prior payment or transaction history or data to "match" with known or identifiable data sources and without requiring any effort by the Customer/buyer and not requiring pre-approved, opt-in or consent before interaction occurs. Therefore the creation of this new channel could be enhanced if it were created by a "matching system" that could look at, watch, monitor or inspect Customer transactions without personally identifiable data being provided to Companies/sellers who are members or subscribers of this new system. This new customer-seller value channel would provide a new way to reach Customers via both broad based anonymous, non-opt-in (e.g. anonymous) methods as well as being utilizable for direct or one to one, highly targeted channels to well known, identified, pre-selected Customers and or to customers who "opt-in" to the new channel to receive optional or additional value based on their existing and future buying or selling activities and transactions. Finally, the new customer engagement channel developed by this invention can be used to enhance communication between Companies and Customers for existing items, goods or services both for previously purchased items such as warranties, product manuals or help/product support in addition to delivering new information or offers regarding future or possible sales transactions.

Referring to FIG. 1, in an exemplary embodiment, a description of the high level and well-known identifiable five parties of an electronic payment processing network 10 may be labeled as follows: a first party in these systems is the holder of a payment form or branded network payment account holder (i.e., a customer, buyer or payor 11), the second party is the payment acceptor or merchant (i.e. a merchant, seller, company or payee 12), the third party is an acquiring bank 13 or the bank which accepts and facilitates the clearing of payments on behalf of or for the benefit of the merchant (the payee 12), the fourth party is an issuing bank 14 (i.e. the bank that issued the card or payment form to the payor, who may or may not extend credit to them, who may provide customer support, billing and collection of the actual payment flow from the payment account holder or "customer" or payor 11 to the other parties) and finally the fifth party is an actual "brand" or payment network system operator 15—e.g. Visa (V), MasterCard (MC), Discover (D), American Express (Amex) and the like, which connects all of the parties together under a well-known brand identity with defined operating, pricing, processing and settlement rules. Note that the American Express card network operates a modified version of the "five party" network for card payments (i.e. it is a three party model including payor, merchant and Amex) in that Amex traditionally has performed the roles of both the issuing bank 14 and the acquiring bank 13 as well as the network operator 15 who sets the payment issuing and acceptance rules (the network rules of all card payment forms are herein included in full by reference). Additionally, ATM network or PIN debit card network operators function in a similar manner facilitating origination, routing and settlement of payment requests between customer, merchant, bank or ATM operator and other payment networks or alternative payment processors, originators or recipients and the like.

Figure 2:
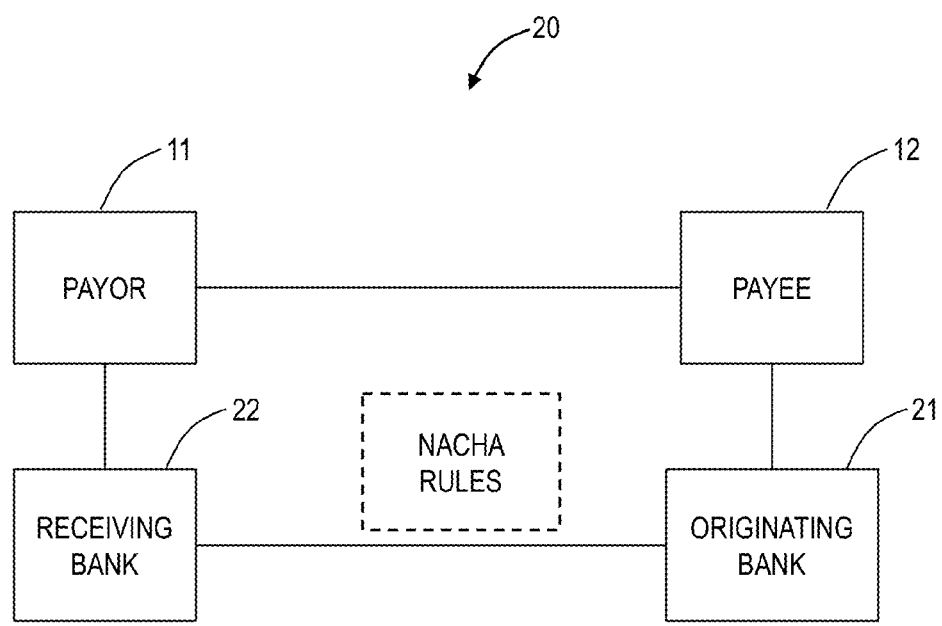
FIG. 2 is a diagram of an Automated Clearing House (ACH) network.

Referring to FIG. 2, in an exemplary embodiment, an Automated Clearing House (ACH) network 20 follows a related business and processing model for its electronic payment services using a four (4) party model: the payor 11, the payee 12, an Originating bank 21 (or Originating Depository Financial Institution—ODFI, who is the processor and or sponsoring bank of the payee) and a Receiving bank 22 (or Receiving Depository Financial Institution—RDFI) who debits the payor's bank account to initiate the payment transfer back to the ODFI who processes it on behalf of the payee. In the case of ACH payments, the National ACH Association (NACHA) provides the processing and settlement rules (herein included in full by reference) in a similar manner to the Visa, MasterCard or American Express network model. Various network operators, with the Federal Reserve being the largest, provide connectivity to clear or exchange NAHCA files between ODFI and RDFI. The most common payment usage of the ACH method is for Online Bill Payments (OLBP) or Electronic Bill Presentment and Payment (EBPP), ecommerce and or person to person payment (PayPal and the like) and all of these payment forms may be seen to function at a high level using a similar business method, pricing and sales as well as risk management models to the card payment methods. Additionally, the Federal Reserve and private third party networks facilitate the check payment settlement network, including the image settlement rules set by ECCHO (herein included by reference in full), in a role similar to ACH networks and or card or electronic payment network systems.

Thus, at an overall or high level, the payments marketplace can be seen to be a collection of cooperating parties working together to provide customers (payors and payees) with a comprehensive set of payment processing services that operate under a consistent set of business rules, pricing or fee structures and common standards or rules, such as risk management or security requirements, electronic file formats, electronic messages or records and the like to facilitate payment transactions while minimizing risk of fraud and maximizing customer and merchant acceptance of their payment form in the marketplace. One example of a cooperating set of operating rules is the compliance rules of the Payments Card Industry (PCI) Data Security Standards, herein included in full by reference including the newest forms or modifications or custom system rules. Another example is the Industry Standards Organization (ISO) electronic messaging standards for financial transaction card originated messages—Interchange message specifications such as the ISO 8583 format and the like. Note that business models, rules, pricing, and often compliance, security and risk management specifications may vary by payment form or provider or operating party within a network system but often these elements may be dictated by the branded payment network operator as a requirement on all or some of the participating parties.

Beyond the five well known parties that are commonly identified in the card payment networks, there are additional parties that help connect or operate components of a payment or transaction processing network to facilitate key aspects of the processing lifecycle. These additional parties provide critical or value added services for or on behalf of one of the existing five parties. Some examples of these additional parties or vendors are: Point of Sale (POS) equipment providers who facilitate magnetic stripe card "swipe" transactions including the "swipe box" terminal providers such as VeriFone, Hypercom, Ingenico and the like. Other examples include electronic network connection "switch" services which acquire payment "messages" and process and or route them to appropriate processing operators which link POS transaction "swipes" to the acquiring and issuing banks—examples of these are vendors such as First Data, TSYS, Global Payments, and the like. Additionally, non-POS environments such as ATM or PIN debit networks, Internet websites, ecommerce transactions and the like may flow through ATM machines, PIN debit keypad devices, ecommerce shopping carts and or "payment gateways", aggregators or network providers such as NYCE, Star, CyberSource, PayPal, Square, Google Checkout, Authorize.NET and the like who facilitate payment transactions by routing the transaction details to switches and or other vendors or processors in order to reach banks and or payment networks. Businesses or merchants may also purchase or utilize other business transaction processing services such as invoice or lockbox services, loyalty or rewards points tracking and processing, or rebate or coupon redemption processing services, all of which may flow through similar acquiring and processing networks or new alternative payment processing services and the like. Finally, new "mobile" transactions may be made by customers (payors) or received by merchants (payees) using cell phones (or smart phones, or tablet devices or PDAs such as the Apple iPad or other digital assistants and the like) which may use one of a variety of "near field communication" (NFC) methods, barcode scanning, human biometric methods as well as the more traditional card "swipe" models to initiate a payment transaction. These transactions allow the merchant (payee) to charge the customer (payor) for goods and or services and facilitate their purchase(s) by one of a variety of card or account numbers, tokens, one time use numbers, pseudo IDs, GUIDs, stored value identifiers, e-wallets, and the like which may perform a similar if not identical function to the traditional plastic card payment "swipe" transactions.

Finally, there are various sales, service and support parties, widely known as Independent Sales/Service Organizations or "ISOs", which facilitate the recruitment of and selling to merchants to accept (or "acquire") many of these payment forms, along with the delivery, training, management and operational effectiveness of a payment form or method and any required equipment within a targeted market. ISOs that sell a specific payment form to payment receivers (payees) usually explain the pricing, delivery and operation of these payment services to their customers across the various retail stores, merchants or in general any business desiring to have payment processing services. Thus, given the interconnectedness, complexity and possible combination of parties operating to originate, clear and settle a payment transaction, it can be seen by those skilled in the art that the understanding of and at times assignment of risk or ultimate responsibility for a transaction across these various entities may be confusing or at times even hidden from the participants and may unfortunately be a variable or subjective matter to some of the parties or unknown to any or each party before a transaction occurs. Additionally it is well known to those in the art that these systems may provide various levels of data, information, details or knowledge about a specific transaction, set of transactions or type of transactions to the merchant (company or seller) based on the type and level of service purchased by or subscribed to by the merchant or company from the electronic payment transaction system. Thus these existing systems may provide various levels of costs, security, reliability, information and delivery or support and the like to companies who utilize them to facilitate the selling of goods and services to their customers.

Prior attempts to utilize the data, results or values from transactions between buyers and sellers to identify, track or enhance interactions with Customers are well known to those with experience in these arts. The failure of these prior or existing well-known systems to provide automated, autonomous and anonymous matching of merchants/companies to buyers/customers has created the need for the systems and methods described herein. That is, in an exemplary embodiment, the systems and methods provide an accurate technique to match transactions between buyer and sellers without relying on the actual merchant or seller name. Additionally, the current invention avoids the failures of previous systems which failed due to the various and wide ranging inconsistencies in merchant payment and transaction data streams which prevent matching on merchant names, standardizing merchant names or standardizing key data elements such as Merchant ID and the like. The current embodiment overcomes the weaknesses in the transaction data stream caused by human error, data input error, inconsistent application of names or identities in merchant processing and many other errors of the like. Thus the current invention provides confidence to match merchant names and or IDs across key data elements.

The key novelties of the invention are as follows:

1. The invention creates an engagement channel that is agnostic to the source of the Payment Data, payment type, payment system, and processes or Devices used to process payments making it truly universal by overlaying all previous systems.

2. The invention sits in the middle of the various players as a hub versus trying to connect the various entities directly, while it also enables a "network effect" by leveraging the data, customers, connections and value of all of these players while creating new connections.

3. The invention creates a channel that supports two types of engagements. The first type of engagement allows Companies to publish content to their Customer or an anonymous Customer via connections using various types of Payment Data without a Customer having to register with the System and without the Company needing any PII. The second type of engagement allows Companies to publish content in a variety of ways, including through a dedicated portal or social media site, such as Facebook and the like, if the Customer elects to register with the System.

4. The invention allows Customers to automatically receive all artifacts of a Transaction for both payments and the exchange of value by simply engaging in a Transaction.

5. The invention utilizes a Payment Key established prior to attempting to identify Companies from Payment Data versus using logic and algorithms to make the match based solely on the Payment Data itself. Such logic typically utilizes an external data source, such as a list of standardized merchant names, for matching whereas the invention does care what fields are used and what the merchant name is because it is using a key derived from static data that could be anything. In the example above, the invention could identify and distinguish Joe's Pizza from Pizza by Joe.

6. The invention utilizes more than one field of data for matching versus relying on just the merchant name field. Based on current convention the invention would also use merchant city, but again, the invention is designed to use all available static field data.

7. The invention is not only able to match a Company but also a Location and Device(s) at Locations, including scenarios where Companies have similar names, identical names or units of a chain or franchise operating under identical business names at Locations.

8. The invention is able to merge Payment Data and Transaction Data which are available through disparate systems into one engagement channel. As a result the invention allows for a holistic understanding of a Transaction including both the exchange of value and the exchange of payment.

9. The invention has a specific process for identifying and handling duplicates. Much like a domain name the first merchant to register is assigned the payment key made up of the static data fields. If another merchant wants to register and happens to have the same field values, the system will not allow the registration but will instead provide an alternative value for the static fields, which it will hold so the merchant can have it changed with its acquirer. This avoids any errors related to duplicates.

10. The invention identifies the payment key in advance using two unique methods. One is to provide a merchant with a payment card to run (both with and without a unique card number) and the other is to get the data from the merchant account record at their processor or acquirer. These are the only two methods that provide the merchant field and other field values in advance.

11. The invention supports harvesting Payment Data used for matching from both client side software, such as a browser extension, or via server side software that runs the harvesting without the need of client software, which for example can be done by executing server side application upon a page load containing Payment Data whereby the server side code extracts the Payment Data and transmits it to the System without requiring and installation by the Customer. Also the location of the server side process may vary.

12. The invention supplements the data within the engagement channel to add more value beyond the traditional payment data.

13. The invention is able to link any string of characters to identify Products within Transaction Data versus relying on standard product numbers, such as GTINs.

14. Based on matching Products from transaction Data, the invention can automatically distribute Product Data, such as user manuals, warranties, additional services, coupons, upgrades and other material and the like.

Before describing the systems and methods, it is desirable to define the following terms for use in describing and defining the systems and methods throughout this document. Whenever used in this document, whether in capitalized or uncapitalzed form, singular or plural form, the following words or terms should be generally interpreted to conform to the following ideas, concepts or intentions as defined as follows:

1. Account—Any unique virtual or real instance unique to and/or associated with a Company, Customer, Third Party and/or Third Party System.
2. Acquirer—Any individual or entity that can enable and/or cause to enable Company to perform Payment Processing.
3. Aggregator—Any individual or entity that acts as an agent for an Acquirer typically utilizing its own systems to receive and route authorization and/or settlement requests.
4. Associations—Any and all networks or groups of individuals or entities that interact for the purpose of authorizing and settling Payments. Examples include but are not limited to Visa and MasterCard.
5. Company—Any individual or entity, including vendors, that is able or can become able to perform any step, method or aspect of Payment Processing and/or a Transaction.
6. Company Data—Any and all data in a machine readable or human readable format, including image files and pictures, associated with a Company, which could include but not be limited to:
  a. Category—One or more categories (e.g., restaurant, grocery store etc.) that could be used for grouping transactions, reporting and/or tax purposes.
  b. Contact Information—One or more addresses, which could include latitude and longitude, mapping information, postal service codes and/or geolocation information, phone numbers, fax numbers, email addresses, uniform resource locators (URLs) or any other contact or reference information.
  c. Coupon—One or more coupons (see definition below)
  d. Invoice—One or more invoices.
  e. Link—One or more URLs to other web sites or other web based locations, which may include FTP sites, blogs, portals, personal devices, tablets, PDAs and the like.
  f. Message—One or more messages consisting of any type of characters and of any length, which could be in plain text, Hyper Text Markup Language (HTML), contain graphics or be in any other format.
  g. Menus—One or more menus and/or order forms.
  h. Name—One or more legal or other names.
  i. Offer—One or more advertisements, offers, promotions or other related marketing materials, methods, or systems.
  j. Payment Data—See definition below
  k. Product Data—See definition below
  l. Purchase Orders—One or more purchase orders.
  m. Rating—One or more rating scales in any format.
  n. Receipts—One or more receipts.
  o. Reviews—One or more reviews.
  P. Rewards Rules—One or more Reward Rules (see definition below)
  q. Schedule—One or more schedules and/or calendars, which could identify business hours.
  r. Survey—One or more surveys of any type and in any format.
  s. Transaction Data—See definition below
7. Company Payment—One or more Payments, which could include one or more Payment Numbers and/or one or more Payment Amounts, created by and/or known to System and associated with or that can be used to identify a specific Company, Location, Device and/or Account.
8. Company Payment Analysis—The act of using Company Payment Data to identify associated Company, Payment Key and/or Account.
9. Company Payment Data—Any and all data in a machine readable and/or human readable format associated with Company Payment.
10. Company Payment Submission—The act of Payment Processing being performed for Company Payment.
11. Coupon—A monetary or non-monetary benefit, of any kind and in any value which could include but is not limited to currency, points, and/or airline miles, which requires presentment and acceptance by Company during a Transaction, provided by or on behalf of Company and/or Third Party to Customer.
12. Coupon ID—One or more characters and/or one or more groups of one or more characters unique to and/or that can be used to identify one or more Coupons, presented in any format such as barcodes, text, numbers, unique IDs and the like.
13. Coupon Presentment—The act of presenting a Coupon to Company.
14. Coupon Submission—The act of Coupon ID being received by System.
15. Coupon Analysis—The act of comparing a Coupon ID received during Coupon Submission with Coupon IDs that exist in System to identify if there is a match.
16. Coupon Processing—The act of providing approval or decline for Coupon redemption and, based on approval or decline, adjusting the coupon counts and/or other associated data.
17. Content—Any and all data in a machine readable and/or human readable format stored in and/or associated with System.
18. Credential—One or more characters and/or one or groups of one or more characters, which can include but is not limited to usernames, passwords, email addresses, fax numbers, phone numbers, twitter addresses, instant messenger addresses or other PII and the like or any combination thereof, unique to and/or that can be used to identify a Company, Customer, Third Party and/or Third Party System.
19. Credential Submission—The act of Credential, and optionally Content, being received by System.
20. Credential Analysis—The act of comparing a Credential received during Credential Submission to Credentials that existing in System to identify if there is a match.
21. Customer—Any individual or entity that engages or could engage in a Transaction with one or more Companies.
22. Data Exchange—The act of adding, inputting, outputting, editing, deleting, viewing, moving, copying, publishing, synchronizing and/or any other data manipulation of Content, as well as the use of optical character recognition (OCR) to extract machine readable data from human readable data, to and/or from System.
23. Data Linking—The act of utilizing one or more characters and/or one or more groups of one or more characters of Credential and/or Content to associate Content with one or more Companies, Customers, Third Party's, Third Party Systems and/or Accounts and/or associate Content with other Content.
24. Device—Any hardware, firmware, software and/or other means used to perform Payment Processing, including but not limited to point-of-sale (POS), credit card terminals, payment gateways, voice response units (VRUs), PC and mobile applications, tablets and the like.
25. Enrichment Data—Any and all data that is not Company Data, provided by System to enrich Company Data, which could include but not be limited to GTIN database, demographic data or geographic data.

26. Enrichment Key—One or more characters and/or one or more groups of one or more characters unique to and/or that can be used to identify specific Enrichment Data and Company Data. For example, a zip code associated with a specific Transaction could be part of Company Data as well as an Enrichment Data thereby allowing Company Data to be linked to Enrichment Data. In this case the Enrichment Data may be demographics about the zip code thereby linking the Transaction with said demographics.
27. Enrichment Key Analysis—The act of identifying Enrichment Keys that exist in both Company Data and Enrichment Data.
28. Enrichment Key Processing—The act of associating Enrichment Data with Company Data using Enrichment Keys.
29. GTIN—A set of characters that identifies Product or services, which could include but not limited to Global Trade Item Number (GTIN), Price Look Up (PLU) and Stock Keeping Unit (SKU) and the like.
30. Interchange—A physical or virtual network, and any other hardware, software and/or process which operates, generates or causes to be derived the transaction data used to obtain authorizations and/or settlement of related funds for Payments, including but not limited to the system used by Visa and MasterCard members, the system used by American Express, the system used by Discover Card, the system used by JCB, the system used by Diners Club, the system used by private label cards, the systems used by Federal Reserve system for clearing checks, and/or the Automated Clearing House (ACH).
31. Issuer—Any individual or entity that can enable or caused to enable a Customer to make a Payment.
32. Key—Any data or indica that may be used to uniquely identify a match between two sets of data or data elements.
33. Location—Any physical place typically but not always denoted by an address.
34. Merchant Account—An account and associated systems and processes established associated with and/or used by Company to perform Payment Processing which are typically established by Acquirer.
35. Merchant Data—Any and all data directly or indirectly associated with a Merchant Account regardless of where said data is stored.
36. Merchant Data Analysis—The act of using Merchant Data to identify associated Company, Payment Key and/or Account.
37. Merchant Data Submission—The act of Merchant Data being received by System.
38. Merchant City—A set of characters associated with Company and/or Merchant Account that are typically, but not always, used to denote the city where the Company is located.
39. Merchant Name—A set of characters associated with Company and/or Merchant Account that are typically, but not always, used to denote the Company's name.
40. Offers—Any and all forms of communication from a company to a customer.
41. Merchant Number—A set of characters associated with and/or that can be used to identify a Merchant Account.
42. Payment—Any form of payment related to a Transaction, which could include but is not limited to credit cards, debit cards, checks, ACH, wires, P2P, cash, coupons, private label cards, stored value cards, and mobile wallet payments.
43. Payment Amount—A sum, which could be expressed in currency or other form, of a Payment.
44. Payment Data—Any and all data and/or information associated with a Payment at any time during its lifecycle, including but not limited any and all data related to Interchange.
45. Payment Data Analysis—The act of using Payment Data to identify associated Company, Payment Key and/or Account.
46. Payment Data Submission—The act of Payment Data being received by System.
47. Payment Key—One or more attributes of Payment Data, Company Payment Data and/or Merchant Data, which could either be in the native form or in a derivative form, unique to and/or that can be used to identify a specific Company, Location, Device and/or Account.
48. Payment Key Analysis—The act of comparing a Payment Key identified during Company Payment Analysis, Merchant Data Analysis, and/or Payment Data Analysis with Payment Keys that exist in System to identify if there is a match.
49. Payment Key Processing—The act of forgoing Payment Key Linking when a match is found during Payment Key Analysis. This process could, but is not required to include, a routine in which the System identifies a new Payment Key value that would be unique in the System, holds that new Payment Key in reservation for the Company to change with their Acquirer and then waits for the Company Payment Submission to occur again.
50. Payment Key Linking—The act of associating Payment Key with a specific Company and/or Account.
51. Payment Number—Any number, which could be a credit card number or similar account number, and or a Transaction ID and the like, associated with a Payment.
52. Payment Processing—The act of authorizing and/or settling a Payment through Interchange regardless of the hardware, software, or processing system used.
53. Personal Finance Manager (PFM)—Any of the many third party financial services applications, websites, portals or systems that provide aggregated financial data across one of more vendors, companies, issuers or the like which may provide various services such as organization, categorization, charting or graphing, analyzing, summarizing, indexing and or various other data processing services to a customer in order to provide enhancements to known financial records, transactions and the like. The PFM typically provides enhanced services or value over the services that a single company, vendor or issuer may provide to their customer via their native, default or built-in applications, tools, websites or services.
54. Personally Identifiable Information (PII)—Any information, data, or knowledge that enables a specific person, Company or entity to uniquely identify, know, target, address, reach or allows to be known a specific person, Company or entity. Examples include but are not limited to: Social Security Number (SSN), Tax ID, EIN, First Name, Last Name, Full Name, phone number, address, zip code, customer ID, email address, website or URL address, electronic address, chip address or ID and the like.
55. Processor—Any individual or entity that can receive Payment authorization and/or settlement requests and route them to the proper entity within payment system.
56. Product—Any and all products, goods or services of any kind associated with a Transaction.
57. Product Data—Any and all data related to Products, including but not limited to description, manufacturing information, user guides, warranties, and/or software.
58. Product Data Linking—The act of linking and/or associating Product Data with a Product Key and/or Product.

59. Product Key—One or more characters and/or one or more groups of one or more characters used to uniquely identify a Product.
60. Product Key Analysis—The act of comparing a Product Key received during Product Key Submission with Product Keys that exist in System to identify if there is a match.
61. Product Key Linking—The act of associating Product Key with a specific Product, Product Data, Company and/or Account
62. Product Key Processing—The act of forgoing Product Key Linking when a match is found during Product Key Analysis. This process could, but is not required to include, a routine in which the System identifies a new Product Key value that would be unique in the System.
63. Product Key Submission—The act of Product Key being received by System along with associated Product Data requested to be linked to said Product Key.
64. Registration—The act of creating an Account and associating it with a Company, Customer, Third Party and/or Third Party System, may include inputting or linking to PII and other Credential data or other indicia such as GTIN or data on items previously purchased.
65. Rewards—A monetary or non-monetary benefit of any kind and in any value, which could include but is not limited currency, points, and/or airline miles, that does not require presentment during a Transaction but instead relies Reward Rules, provided by or on behalf of Company and/or Third Party to Customer. May also be known as Loyalty Points or Programs.
66. Rewards Analysis—The act of identifying if any Reward Rules apply.
67. Rewards Processing—The act of calculating and/or fulfilling Rewards based on Reward Rules.
68. Rewards Rules—One or more rules, formulas or processes, based on Content and/or Payment Data, which used individually or together determine the value of Rewards or Loyalty Points.
69. Sharing Rules—One or more rules or processes, based on Content and/or Payment Data, which is used by System to determine which Content can be shared, as well as the associated perimeters for sharing, including but not limited to when the Content can be shared, to whom the Content can be shared and how the Content can be shared.
70. Sharing Analysis—The act of identifying if any Sharing Rules apply.
71. Sharing Processing—The act of sharing Content and/or Payment Data based on Sharing Rules.
72. Statement—A machine readable and/or human readable list, in any form, of Payment Data, Transaction Data or Sales Data and the like provided by or on behalf of Issuer, Third Party, a portal or a PFM application and the like which may generate Statements or repurpose those generated by issuers, vendors or other companies.
73. System—Any hardware, firmware, software, applications, processes, or other mechanisms whether physical or non-physical related to and/or enabling the claims herein.
74. Third Party—Any individual or entity that is not Company or Customer.
75. Third Party System—Any hardware, firmware, software, applications, processes, or other mechanisms whether physical or non-physical that is not System.
76. Transaction—A process that involves the exchange of value such as the sale of a Product in exchange for a Payment.
77. Transaction Data—Any and all data related to value exchange of a Transaction as well as any data not available in Payment Data, such as sales tax, which could include line item details of Transaction such as would be displayed on a receipt, including but not limited to GTIN, product or service description.
78. Transaction Number—A set of characters associated with Payment during Interchange that could be used to track Payment, including but not limited to Visa's Transaction Identifier or authorization numbers assigned for card transactions.
79. Vendor—Any third party company who provides outsourced services to companies.
80. Value—the tangible or intangible item, good or service that causes, incents or otherwise motives Customer to transact with Company by exchanging a Payment with Company in order to receive the item, good or service or benefit from the transaction in any way.

Figure 3:
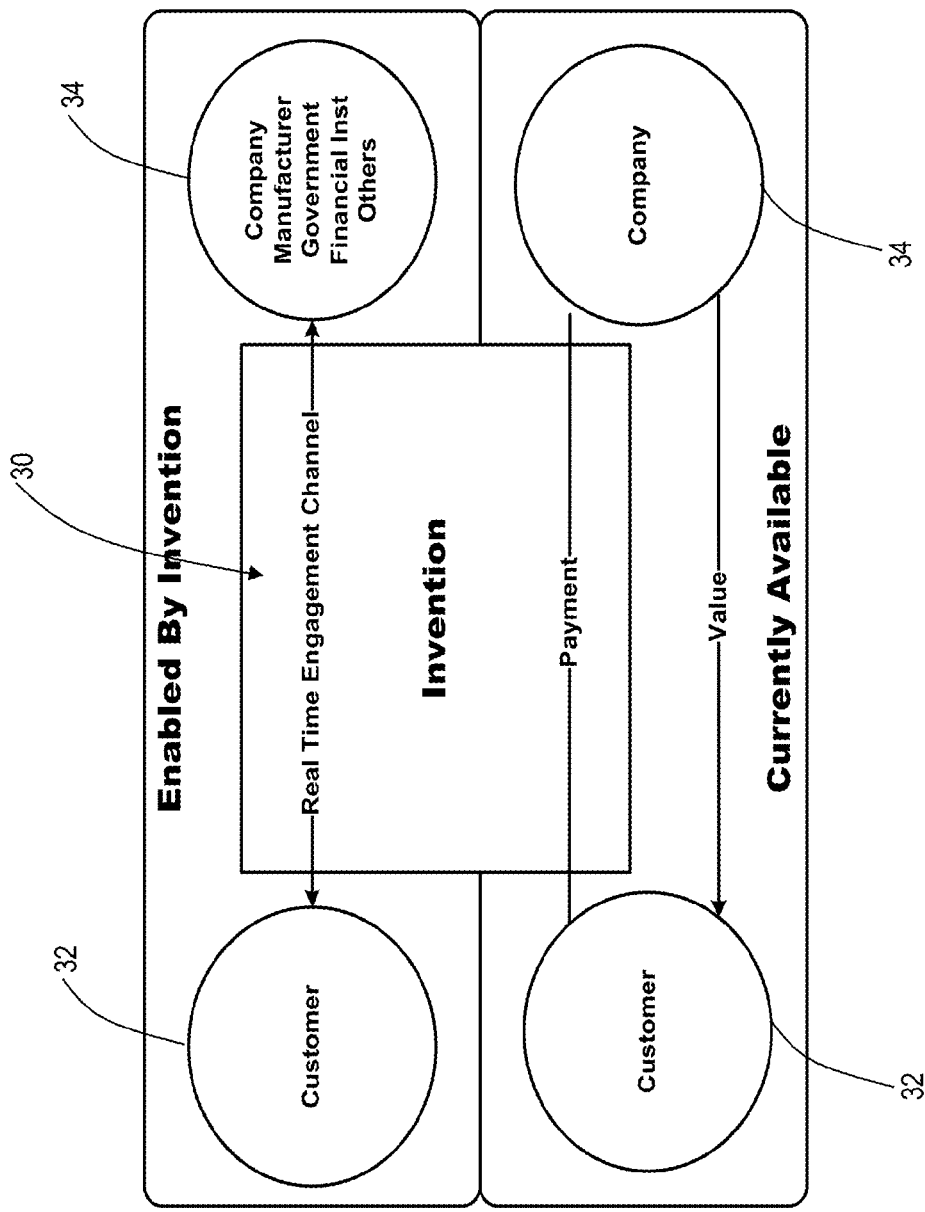
FIG. 3 is a block diagram of a real time engagement channel enabled by the systems and methods described herein.

Referring to FIG. 3, in an exemplary embodiment, a block diagram illustrates a real time engagement channel 30 enabled by the systems and methods described herein. In the general course of commerce, or buying and selling, customers 32 engage in transactions with companies 34 every day where they exchange money (a payment in some monetary form) for some product, good or service (or something of value) provided to them by the company 34. The type of value and payment used to facilitate these transactions can vary but the process is universally understood and accepted and it is understood by those in the art how these well-known transaction processing systems produce sets of payment data which describe, define or identify the act value exchange transaction between the buyer and seller. For example, two exemplary processes are described in FIGS. 1 and 2 although any process is contemplated herein.

Typically, the level of transaction detail or knowledge encompassing a transaction is at an anonymous level, especially for companies operating from brick and mortar store locations where the customers 32 walk in, purchase something, and walk out without the company 34 ever knowing who they were. However, regardless of the type of company, there is one constant, which is needed in order to engage customers 32 in future transactions, which is that the company 34 must obtain some type of personal information or PII, typically an address of some type, such as an email address, fax number, phone number and the like to reach out and communicate with the customer 32. In order to have such a personal contact point, the customer 32 must take action to opt-in or volunteer to set it up or provide this data, and then they must actually follow through and provide this data to the company 34. So, in order to allow the company 34 to engage the customer 32, two things must happen: the customer 32 must establish a personal address or point of contact or other PII data, and the company 34 must obtain one or more of the customers 34 personal addresses. Typically this type of information and communication is provided under some type or form of customer loyalty or rewards system where the customer 32 is incented to provide such information in the hope that they will accumulate some level of value for participating in the system. Such a system of communication has worked well but has many limitations and requires active participation by the parties, the customer 32 and the company 34. Further, statistics show that the customers 32 are not eager to provide personal addresses or PII to the company 34 and, in fact, many states are passing laws that restrict companies from even asking for them. So what was a difficult process of establishing a relationship between the company 34 and the customer 32 is only getting harder.

There are other engagement options, such as television and radio, or other well-known marketing and sales methods, which do not require the two steps listed above, but in those cases the company 34 is not specifically engaging the customer 32 but widely sending out a broadcast message or offer for anyone with a TV or radio, phone, mailbox or email box and the like to see or hear. So, while such forms of engagement do eliminate the two requirements above, the content is not able to be addressed to a specific audience or targeted audience by a company, which makes sense because there is no personal address available to do so.

The systems and methods described herein not only eliminate the two requirements described above but also allow the company 34 to provide content to only their customers 32, for example, such as to those who have previously purchased certain goods and services from them as well as provide content to new, unknown or anonymous customers. The systems and methods create a brand new channel, i.e. the real time engagement channel 30, directly between the company 34 and the customer 32 without any of the limitations and or requirements currently in place today. Specifically, the systems and methods do this by applying processes and technology to the existing and well establish system of electronic payment processing. Unlike cash or other similar instruments, electronic payments, such as credit or debit card payments and the like, have data artifacts and this data typically flows through various networks and systems, i.e. payment data. The payment data associated with electronic payments has both static and dynamic data elements. For instance, a dynamic data element may be the Payment Amount, because that changes for each transaction, whereas Merchant Name and Merchant City may be static data that is associated with every Payment. The systems and methods are able to use the static data to identify the company 34, such that when the customer 32 views the Payment Data on a Statement, the company 34 can then distribute information to and or engage with the customer 32. So, the systems and methods leverage the transaction data to create the new channel 30 on top of the existing payment process.

As shown in FIG. 3, one of the key aspects of the systems and methods is that it does not require any changes in the systems used to process payments or the processing itself. It lays on top of the existing infrastructure making it universally available to all Companies 34 and Customers 32. At a high level, once the Customer 32 makes a Payment to the Company 34, that Customer 32 can view basically any type of information offered or published from the Company 34 and Third Parties such as manufacturers and the like when viewing their Statement.

Even if the payment system included more data in the Payment Data, the data is still static and at one point in time. For instance, if Payment Data included the street address of the Company 34, which is actually a possibility, that is still static information versus having a channel that allows the Company to publish content in real time and on a dynamic and changing basis. Again, the systems and methods establish the channel 30 and do not seek to simply add more information to the current Payment Data. That is, the channel 30 uses whatever Payment Data is included in the current payment process without changes thereto.

While the systems and methods utilize the current payment process, there are two key differences. First, the channel 30 can be used to display any dynamic content related to Payment Data whereas the payment process can only display static information. Second, the channel 30 can be used to link the Company 32 and the Customer 34 such that after a single purchase the Company 32 can continue to engage the Customer 34 without Payment Data, such as through a portal or PFM, whereas the payment process does not link Companies 34 and Customers 32 other than to exchange payment for value.

As described above, the systems and methods seek to establish the new channel 30 between the Company 34 and the Customer 32 that does not require the Customer 32 to establish a personal address or the Company 34 to obtain said personal address. Further, the systems and methods seek allow the channel 30 to be used by the Company 34 to deliver content only to their Customers 32 versus a broadcast that could be received by anyone. Once the channel 30 is established, there are a variety of forms of engagement that can take place not only between the Company 34 and its Customers, 34 but can also include Third Parties.

Figure 4:
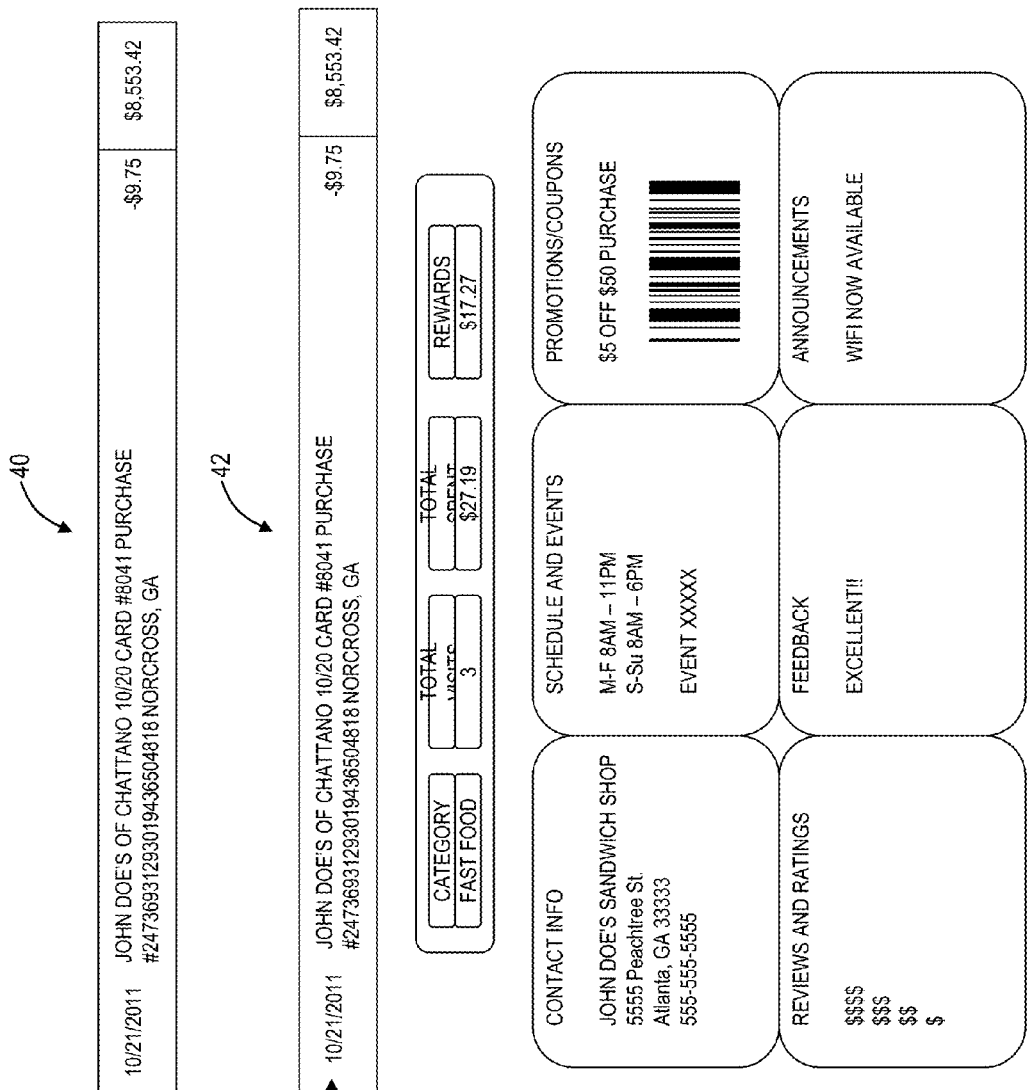
FIG. 4 is an exemplary transaction and an exemplary screen shot using the channel of FIG. 3 with the transaction.

Referring to FIG. 4, in an exemplary embodiment, an exemplary transaction 40 and an exemplary screen shot 42 of using the channel 30 with the transaction 40 are illustrated. The transaction 40 includes data the customer 32 may see when viewing a statement, such as online or the like. Note, the transaction 40 is shown for illustration purposes and those of ordinary skill in the art will recognize the transaction 40 could take various different forms with different static and dynamic data included therein.

In various exemplary embodiments, the systems and methods provided layer the channel 30 on the transaction 40. This can take various forms as will be described herein such as software included on the customer's 32 computer or device viewing the transaction 40 that keys in on the data associated therewith to bring up details such as the exemplary screen shot 42. The exemplary screen shot 42 shows an exemplary client-side graphical user interface (GUI) based on the transaction 40. Generally, the channel 30 is based on connecting the customer 32 and the company 34 through the Payment Data included in the transaction 40 with the exemplary screen shot 42 being one exemplary interaction over the channel 30.

For example, the customer 32 can view the transaction 40 in whatever format it is available in such as, without limitation, a secure website (e.g., visa.com, bankofamerica.com, wellsfargo.com, etc.), a financial website or PFM (e.g., mint.com), accounting software (e.g., Quicken, Quickbooks, etc.), and the like. The customer 32 can have software installed that parses the transaction 40 and enables the customer 32 to bring up the screen shot 42 which can be located in another server hosting the channel 30. Through the channel 30, the company 34 can interact with the customer 32 based on the transaction 40. If the channel 30 is used to link the Company 34 and the Customer 32, the same dynamic information shown above could be displayed basically anywhere.
Company Matching When Payment Processing is performed, the resulting Payment Data or transaction data has both static and dynamic data elements that can vary by Location and Device. Dynamic data elements could be the Payment Amount, while the static elements could be Merchant Name and Merchant City. In various exemplary embodiments, the systems and methods include a system to operate the channel 30 using the payment data. In order to identify a Company, Location and or Device from Payment Data, the static data elements of Payment Data must be associated to a specific Company, Location and Device. As an example, if the only static elements of the Payment Data are Merchant Name and Merchant City, then the value of Merchant Name and Merchant City together form a unique identifier (herein referred to as a Payment key). When the Payment Key is associated in System with a specific Company, Location, and Device the System can identify that same Company, Location and Device within Payment Data provided by a variety of sources in the future. Once that capability is established, Company and Third Parties can publish Content or Offers to Customers by either attaching the Content, which is established in Data Exchange and Data Processing (see below), to the Payment Data or displaying it elsewhere, such as in System directly or in Third Party Systems.

For example, conventionally, systems use the merchant name solely to identify the merchant from the transaction 40. However, the Merchant Name used for Payment Processing does not need to match the actual business name. Unlike systems such as used for domain names, because Merchant Name is not used as the identifier for Payment Processing (i.e., Merchant Number and Payment Number are typically used to fulfill payments and Merchant Name is typically used just to provide the Customer information regarding the Transaction) there is no requirement for Merchant Names that flow through Payment Processing to be unique, and as such, there may be duplicate Merchant Names. Using Merchant Names to match Companies with Payment Data and transaction data is limited in its capacity (e.g., if Joe's Pizza's Merchant Name used for Transactions is Pizza by Joe no match is possible). Using Merchant Names to match Companies with Transactions is prone to errors and matching the wrong merchant to the wrong transaction (e.g., if there are two Joe's Pizzas the matching may match the wrong transaction with the wrong Joe's Pizza) given the lack of clarity between merchant name and which location and device generated the transaction. If the message format for Payment Processing ever changes whereby a Merchant Name is not used for some reason (e.g., Merchant Name is replaced with an ID number) using Merchant Names to match Companies with Payment Data would not work at all.

The systems and methods identify the value of all useable (i.e., the minimum data fields that are universally or mostly presented on Statements realizing more fields of data are available and may be used in the future) static fields, which can include the Merchant Name field, that is passed as part of Payment Processing in advance of Transactions so it is not reliant on the Merchant Name matching or having a similar value as the Companies business names to match Companies to Transactions. In fact, the systems and methods do not care which fields are used and what the Merchant Name is because it is using a key derived from static data that could be anything. In the example above, the systems and methods could identify Joe's Pizza from Pizza by Joe because it is not reliant on the Merchant Name being similar or the same as the Company's business name, which in this case is Joe's Pizza. The systems and methods utilize more than one field of data for matching versus relying on just the Merchant Name field. In some cases, Merchant name could be the only static data that can be used for matching but that is not typically the case. And even if it was, the systems and methods can identify a Company with a Merchant Name value, even if it is not even close to the Company's business name because the systems and methods identify the value of Merchant Name, whatever it is, prior to performing a matching. In an exemplary embodiment, the systems and methods would also use Merchant City, but again, the systems and methods are designed to use all available static field data, which includes both Merchant ID and Payment Number even though those are not traditionally displayed on Statements for privacy and security reasons. The systems and methods have a specific process for identifying and handling duplicate Payment Keys. Again, because typically Merchant ID and Payment Number (both of which are required to be unique within a given payment system) are used for identifying the Customer and Company related to a Payment, there is no requirement that remaining static fields, which are the fields primarily used to populated Statements, need to be unique. In order for the systems and methods to match in such an unstructured environment, duplicate detection and handling is required. Much like a domain name, Payment Keys are associated with Companies on a first come, first served basis meaning once a Payment Key is assigned to one Company it cannot be assigned to another except if certain situations, such as the original company is no longer in business, decided not to use it etc., or if the format of the Payment Key changed (e.g., new static field become available thereby making the Payment Keys between the two companies unique). If another Company wants to register and happens to have the same field values (i.e., the same Payment Key value), the System will not allow the registration or assignment of the Payment Key but will instead provide an alternative value for the static fields, which it will hold so the Company can have it changed with its Acquirer. This avoids any errors related to duplicates.

The systems and methods identify the payment key in advance using two unique methods. One is to provide a merchant with a payment, typically a debit/credit card, that has either a unique Payment Number and or Payment Amount such that the System can identify the Company that processes the payment. As an example, the System could provide a Company with a credit card 1234 1234 1234 1234 and instruct the Company to run a charge of $0.17. In this example, the charge amount is unique to the Company such that when System received the Statement for the credit card it can identify the Company based on the $0.17 charge. This procedure can be done for each Device and each Location using the same principle. Further a unique credit card number could be assigned versus a unique charge amount. The other method is to get the data from the Merchant Account record on file at the merchant's Acquirer, processor or the like. These are the only two methods that provide the Merchant Name field and other field values in advance which allow the system to generate the unique Payment Key.

While the systems and methods utilize known values that do not need to match a business name, the Payment Key can appear in different places within the Payment Data and Statements on an Issuer by Issuer basis. Therefore, in addition to its unique approach and systems for matching the Companies, the systems and methods also employ logic to find the matching value within a set of data. Typically it can be done with a wild card search but can employ other methods. In addition, while the systems and methods can rely on multiple data fields, not just the Merchant Name field, some of the static fields can be truncated by the issuer. For example, if one of the static fields used in the Payment Key is Merchant City, and the city value is Anywhere, it is possible that one Issuer may display Anywhere on a Statement whereas another Issuer may display "Anywhe". Therefore, the systems and methods could employ logic to identify the probability of a match based on the number of fields matched and the number of characters within the field matched or similar systems and methods which would produce unique results.

To perform the aforementioned matching of the transaction 40 to the customer 32 and the company 32, a Payment Key (the static data field values derived using the two methods listed above) must be known by the system and Payment Data must be received by the system to make a match.

Company Matching: Company Payment Method

Figure 5:
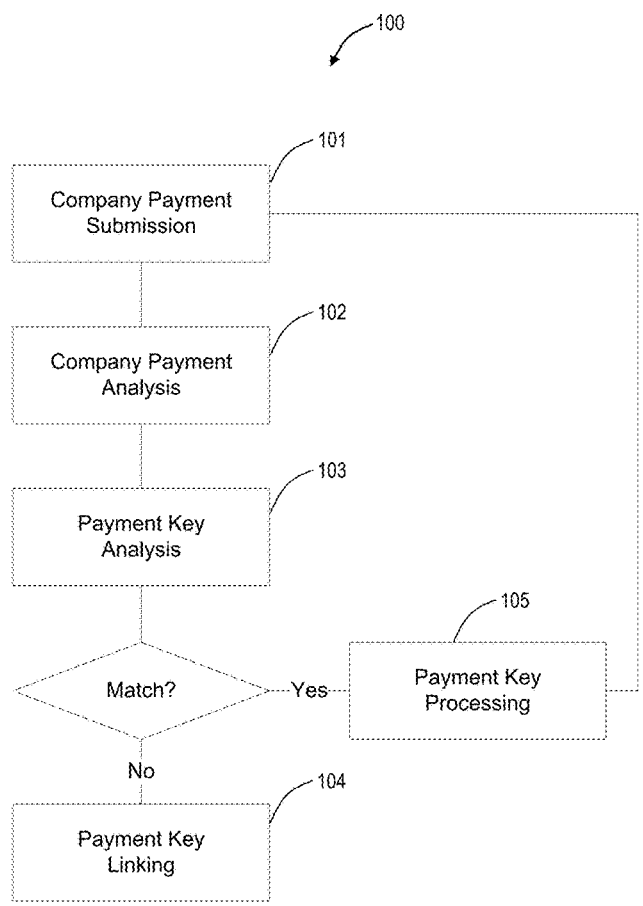
FIG. 5 is a flowchart of a company payment method for deriving a payment key.

Referring to FIG. 5, in an exemplary embodiment, a flowchart illustrates a Company Payment method 100 for deriving a Payment Key. The payment key is used by the system to link the transaction 40 to the Customer 32/Company 34 in the channel 30. The method 100 utilizes a Payment with characteristics associated with a specific Company and Location (herein referred to as Company Payment) to be used to not only identify the Company, Location and Device related to Company Payment but also to identify the Payment Key needed to identify Company, Location and Device within Payment Data provided by various sources in the future. Once the System has identified the Company, Locations and Devices, it can extract the Payment Key from the Payment Data and associate those unique Payment Keys with the Company, Locations and Devices. There is a possibility that two Companies could have the same Payment Key. In that case, System will not link the duplicate Payment Key if one exists in the System but will instead recommend a new Payment Key that the Company can set up with its Acquirer.

With respect to FIG. 5, assume the following:
Company: Company ABC
Location: Location #1
Merchant Name: ABC 1
Merchant City San Diego
Company Payment Amount: $0.12

Company Payment Submission (step 101), the act of Payment Processing being performed for Company Payment, occurs. Based on the assumptions above, a Payment of $0.12 is processed by Company ABC using a Device at Location #1. Next, Company Payment Analysis (step 102), the act of using Company Payment Data to identify associated Company, Payment Key and/or Account, occurs. Based on the assumptions above, when the System sees a Payment Amount of $0.12 in Company Payment Data (i.e., the data associated with the Company Payment), it knows the Company Payment is associated with Company ABC/Location #1 and as well the System could now uniquely knows the Merchant ID for that location and or Device ID used to generate the transaction. Additional the System identifies the Payment Key from the Company Payment Data, which, in this example, assuming the static data elements used for the Payment Key are Merchant Name and Merchant City, would be "ABC 1 San Diego". Typically, the Payment Key would be stored as two blocks of data that related to the static fields used, but that is not always the case. Further, the Payment Key could be changed to one or more derivative forms, using encryption or other methods. Next, the Payment Key Analysis (step 103), the act of comparing a Payment Key identified during Company Payment Analysis, Merchant Data Analysis, and/or Payment Data Analysis with Payment Keys that exist in System to identify if there is a match, occurs. Based on the assumptions above, the System would be looking for a match of "ABC 1 San Diego". If the Payment Key identified for Company ABC/Location #1 (ABC 1 San Diego based on the assumptions above) does not exist within System, then Payment Key Linking (step 104), the act of associating Payment Key with a specific Company and/or Account, occurs. Based on the assumptions above, the Payment Key of "ABC 1 San Diego" would be associated with Company ABC/Location #1 such that when the System then receives Payment Data from any source in the future and it sees "ABC 1 San Diego" it can associate, link or establish a channel knowing Payment with Company ABC/Location #1, thereby allowing the Company, as well as Third Parties, the ability to send and receive data from the Customer without ever having any PII of the Customer. The system establishes this engagement channel by attaching said data to the Payment that was matched to Company ABC/Location #1 or displaying the data elsewhere, such as in the System itself. If the Payment Key identified for Company ABC/Location #1 (ABC 1 San Diego based on the assumptions above) already exists within System, Payment Key Processing (step 105), the act of forgoing Payment Key Linking when a match is found during Payment Key Analysis, which could include a routing in which the System identifies a new Payment Key value that would be unique in the System, hold that new Payment Key in reservation for the Company to change with their Acquirer and then wait for the Company Payment Submission to occur again, occurs.

Various exemplary embodiments are contemplated of the method 100 including, without limitation:

1. Company performs Payment Processing of the Company Payment
2. Customer performs Payment Processing of the Company Payment
3. Third Party performs Payment Processing of the Company Payment
4. System performs Payment Processing of the Company Payment
5. Third Party System performs Payment Processing of the Company Payment In an exemplary embodiment, the method 100 can be performed using a payment method, i.e. credit card, provided to the company or merchant by the system solely for creating a transaction to derive the payment key therefrom.

Company Matching: Merchant Data Method

Figure 6:
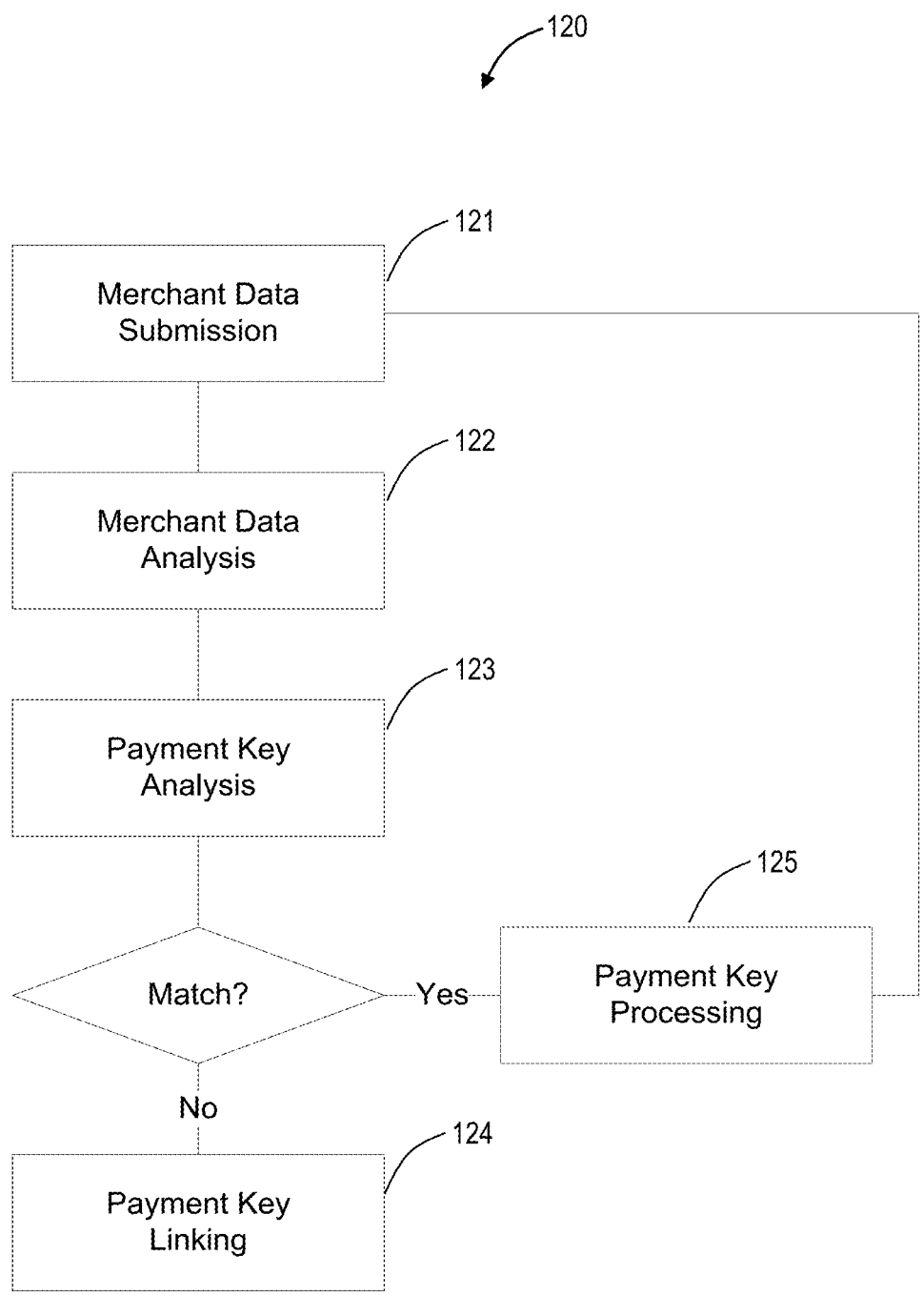
FIG. 6 is a flowchart of a merchant data method.

Referring to FIG. 6, in an exemplary embodiment, a flowchart illustrates a Merchant Data method 120 for deriving a Payment Key. The method 120 does not require Payment Processing of a Company Payment, but instead utilizes the data associated with a Merchant Account (herein referred to as Merchant Data) to identify the Payment Key for a specific Company, Location and Device. The Payment Key can be identified from a single record or group of Merchant Data records. Since the Payment Key should be linked with a specific Company, Location and Device this method employs a different means for identifying the Company. That is because the Payment Keys could be extracted from one or more Merchant Data records without the System knowing which Companies to LINK ? them to. Unlike the Company Payment Method which utilized a Company Payment with specific attributes associated with a specific Company that was used by System to identify said Company, the Merchant Data Method can employ a variety of techniques to identify the Company. Some techniques may include assigning the Company a unique number that is provided to the Company's Acquirer to send along with the Merchant Data records, or to use the Merchant ID that is part of Merchant Data since that is unique, or use the email or phone numbers in the Merchant Data because those are also unique. There is a possibility that two Companies could have the same Payment Key. In that case, System will not link the duplicate Payment Key if one exists in the System but will instead recommend a new Payment Key that the Company can set up with its Acquirer.

With respect to FIG. 6, assume the following:
Method For Identifying Company: Use Merchant ID that is part of Merchant Data
Company: Company ABC
Location: Location #1
Merchant Name: ABC 1
Merchant City San Diego
Merchant ID: 1234

The Merchant Data Submission (step 121), the act of Merchant Data being received by System, occurs. Next, Merchant Data Analysis (step 122), the act of using Merchant Data to identify associated Company, Payment Key and/or Account, occurs. Based on the assumptions above, the Merchant ID is used to identify the Merchant Data is associated with Company ABC/Location #1 and as well the system could now uniquely know the Device IDs for Devices used at that Location. Additional the System identifies the Payment Key from the Merchant Data, which, in this example, assuming the static data elements used for the Payment Key are Merchant Name and Merchant City, would be "ABC 1 San Diego". Typically, the Payment Key would be stored as two blocks of data that related to the static fields used, but that is not always the case. Further, the Payment Key could be changed to one or more derivative forms, using encryption or other methods. Next, Payment Key Analysis (step 123), the act of comparing a Payment Key identified during Company Payment Analysis, Merchant Data Analysis, and/or Payment Data Analysis with Payment Keys that exist in System to identify if there is a match, occurs. Based on the assumptions above, the System would be looking for a match of "ABC 1 San Diego". If the Payment Key identified for Company ABC/Location #1 (ABC 1 San Diego based on the assumptions above) does not exist within System, then Payment Key Linking (step 124), the act of associating Payment Key with a specific Company and/or Account, occurs. Based on the assumptions above, the Payment Key of "ABC 1 San Diego" would be associated with Company ABC/Location #1 such that when the System then receives Payment Data from any source in the future and it sees "ABC 1 San Diego" it can associate that Payment with Company ABC/Location #1, thereby allowing the Company, as well as Third Parties, the ability to send and receive data from the Customer without ever having any PII of the Customer. The system establishes this engagement channel by attaching said data to the Payment that was matched to Company ABC/Location #1 or displaying the data elsewhere, such as in the System itself. If the Payment Key identified for Company ABC/Location #1 (ABC 1 San Diego based on the assumptions above) already exists within System, Payment Key Processing (step 125), the act of forgoing Payment Key Linking when a match is found during Payment Key Analysis, which could include a routing in which the System identifies a new Payment Key value that would be unique in the System, hold that new Payment Key in reservation for the Company to change with their Acquirer, occurs.

Various exemplary embodiments are contemplated of the method 120 including, without limitation:
1. Company submits Merchant Data
2. Customer submits Merchant Data
3. Third Party submits Merchant Data
4. System submits Merchant Data
5. Third Party System submits Merchant Data Product Matching When a Transaction is performed there are typically related artifacts, such as a receipt, bill of sale, or an invoice and the like. Like Payment Data on Statements where the Merchant Name may not actually be the Company's business name, the information related to Products presented on Transaction artifacts may not accurately reflect the related Products. For instance, if a Customer buys a Samsung TV Model 123 from a Company and the receipt only lists TV as the description, the Customer is unable to know, from looking at the receipt, that the TV purchased was a Samsung let alone the Model number. In addition to possible confusion, not being able to clearly identify Product inhibits the Customer from identifying and gathering Product Data, such as user manuals and warranties. Because there are no standards related to what a Transaction artifact must show, use of a known value related to a specific product (herein referred to a Product Key) can allow Products to be identified on Transaction artifacts. Using the same example as above, if the value "TV" was linked to Samsung TV Model 123, for a Company, then by simply knowing TV, the specific Product can be identified and Product data can be associated with said Product. Once that capability is established, Company and Third Parties can publish Content or Offers to Customers by either attaching the Content, which is established in Data Exchange and Data Processing (see below), to the Payment Data or displaying it elsewhere, such as in System directly or in Third Party Systems.

While GTIN's exist there is no required product numbering systems for all Products that would allow a customer to identify a Product. For instance, custom products (i.e., those products made to order) do not have a GTIN. There is no requirement for Companies to use GTINs, even if they exist, on receipts of other Transaction artifacts. Some POS and transaction systems cannot support enough characters for GTINs, which have been recently expanded. Some POS and other transaction systems do not have enough memory to store all of the GTINs, even if they can print them, for all Products sold by a Company. Some Companies do not use product numbers and instead just provide descriptions. Some Companies choose to create internal SKU to GTIN links that hide the GTIN from the buyer or otherwise obscure the original manufacture's identifier or GTIN for an item. In addition, there is no universal repository for product documentation such as user manuals or warranties nor is there a universal or consistent method to link product GTIN to manuals or documentations outside of the systems and methods of the original manufacturer. Using GTINs for matching is limited in its capacity because not every product has a GTIN and because of the POS limitations cited above. For example, if a computer had a GTIN of 987654321 but the transaction data showed 1234, no match is possible. Because of the matching issues, distribution of product related materials is limited and prone to error.

Similar to company matching the concept employed here is that the systems and methods know the value of the product number prior to seeing the transaction data thereby avoiding having to match using GTINs. Instead, the present invention uses any unique value established by the Company or System, which can be unique to a specific Company or unique across multiple Companies, to identify a Product from Transaction Data. Unlike Payment Data, Transaction Data can come from a variety of sources and is not typically included as part of Payment Data (i.e., the payment systems are used for transferring payment and not information about value exchange). As such, the systems and methods allow for Transaction data to be part of or separate from Payment Data. Using the example above, the systems and methods could identify the product with GTIN 987654321 by seeing 1234 because it is not relying on matching against a known database but rather knowing the matching value in advance. The systems and methods allow any offer, information or document to be associated with the unique string value that allows a product match. Therefore, the systems and methods allow a customer to get all data associated with a product by simply making a purchase regardless of the number used for identification or system used for processing.

The ultimate outcome would allow a Company and/or Third Party, such as a manufacturer, to provide Product Data, which is established in Data Exchange and Data Processing (see below), to Customers without requiring any change in systems or the way the Company operates by allowing the Company to associate a Product Key with a Product, and link data or information such as user manuals or warranties, such that when Transaction Data is received by the System it can identify Products without having to rely on GTINs and then distribute the data and information, such as product manuals and warranties, to the Customer. The Product Key does not need to be a number but could, in fact, be the product description. As per the example above, TV could be used to identify the Samsung TV Model 1234.

Note, the systems and methods can support receiving transaction data in any form including email, fax etc and the like. The systems and methods can use both machine readable and human readable data in that it can employ OCR technology to extract the data it needs. The system must know the Product Key and the system must know the associated product materials related to the unique number to link them.

Product Matching: Product Key Method

Referring to FIG. 16, in an exemplary embodiment, a flowchart illustrates a Product Key 900 for deriving a Product Key. This method utilizes a Product Key to identify Products associated with Transactions thereby enabling any form of information or data to be linked to a specific Product.

Product Key Submission (step 901), the act of Product Key being received by System along with associated Product Data to be linked to said Product Key, occurs. Next, Product Key Analysis (step 902), the act of comparing a Product Key received during Product Key Submission with Product Keys that exist in System to identify if there is a match, occurs. If the Product Key received during the Product Key Submission does not exist within the System, Product Key Linking (step 903), the act of associating Product Key with a specific Product, Product Data, Company and/or Account, occurs. If the Product Key received during the Product Key Submission already exists in the System, Product Key Processing (step 904), the act of forgoing Product Key Linking when a match is found during Product Key Analysis, but a new Product Key value that would be unique in the System is suggested, occurs.

Various exemplary embodiments are contemplated of the method 900 including, without limitation:
1. Company submits Product Key
2. Customer submits Product Key
3. Third Party submits Product Key
4. System submits Product Key
5. Third Party System submits Product Key Data Exchange Once Companies and Locations can be identified within Payment Data, a wide variety of information can be shared between Company, Third Parties, and Customers without having to collect any PII, such as email address, from the Customers, once the channel 30 is enabled. Such information can be attached to the related Payment, Transaction or it may be shared in other ways.

The System leverages the existing payment process to create the new engagement channel 30 whereby the Companies 34 can publish and exchange data with the Customers 32 without ever having to collect any personal information or change the way they do business. If the Customer 32 elects to Register (or perform Registration), there may be further benefits because all Companies 34 where the Customer 32 made Payments will be linked to the Customer 32 regardless of whether the Customer 32 ever makes another payment to those Companies 34. So, the System provides an anonymous communication channel tied to Payments, as well as the ability for Customers 32 to establish permanent links with Companies 34.

Data Exchange: Credential Method

Figure 7:
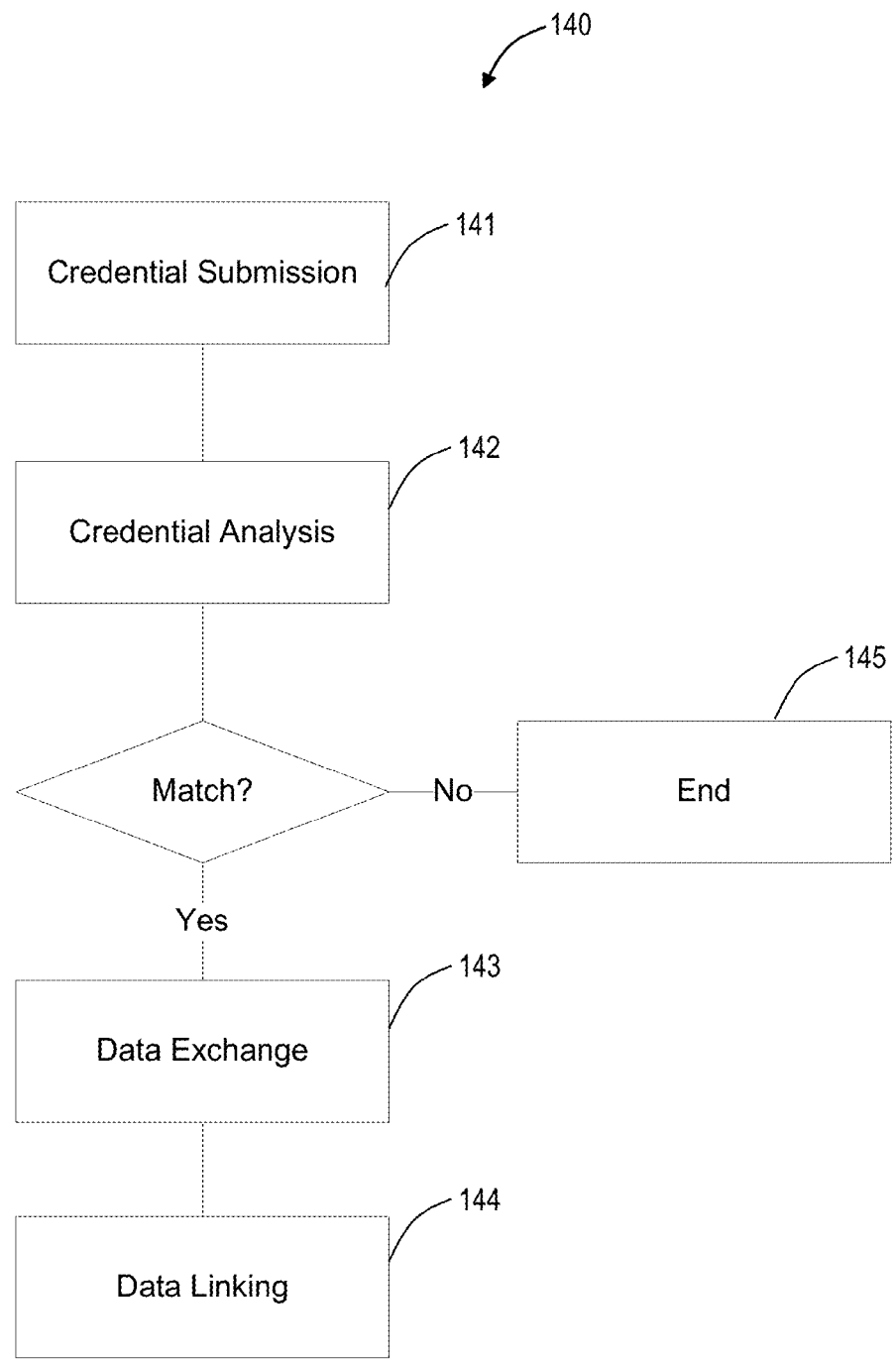
FIG. 7 is a flowchart of a merchant data method that utilizes Credentials to facilitate Data Exchange.

Referring to FIG. 7, in an exemplary embodiment, a flowchart illustrates a merchant data method 140 that utilizes Credentials to facilitate Data Exchange. The method 140 can apply to a wide variety of credentials, connections, and types.

Credential Submission occurs (step 141), the act of Credential, and optionally Content, being received by System, occurs. Content may be received with Credential in the case where the method for Data Exchange is email in which the email address can be the Credential and the email would also include Content. Next, Credential Analysis (step 142), the act of comparing a Credential received during Credential Submission to Credentials that exist in System to identify if there is a match, occurs. If the Credential received during Credential Submission exists within System, Data Exchange (step 143), the act of adding, inputting, outputting, editing, deleting, viewing, moving, copying, publishing, synchronizing and/or any other data manipulation of Content occurs, as well as the use of optical character recognition (OCR) to extract machine readable data from human readable data, to and/or from System, occurs. Additionally, Data Linking (step 144), the act of utilizing one or more characters and/or one or more groups of one or more characters of Credential and/or Content to associate Content with one or more Accounts and/or associate Content with other Content, occurs. If the Credential received during Credential Submission does not exist within System, the operation ends (step 145) typically with an error to the entity submitting the Credentials.

Various exemplary embodiments are contemplated of the method 140 including, without limitation:
1. Company performs Data Exchange using System user interface
2. Company performs Data Exchange by using email, simple message service (SMS), instant messenger, fax, twitter or another type of messaging that is received by System
3. Company performs Data Exchange using Device interfaced with System
4. Company performs Data Exchange using Third Party System interfaced with System
5. Company performs Data Exchange using System file mover systems, including file transfer protocol (FTP)
6. Company performs Data Exchange using System application programming interface (API)
7. Customer performs Data Exchange using System user interface
8. Customer performs Data Exchange by using email, SMS, instant messenger, fax, twitter or another type of messaging that is received by System
9. Customer performs Data Exchange using Device interfaced with System
10. Customer performs Data Exchange using Third Party System interfaced with System
11. Customer performs Data Exchange using System file mover systems, including FTP
12. Customer performs Data Exchange using System application programming interface (API)
13. Third Party performs Data Exchange using System user interface
14. Third Party performs Data Exchange by using email, SMS, instant messenger, fax, twitter or another type of messaging that is received by System
15. Third Party performs Data Exchange using Device interfaced with System
16. Third Party performs Data Exchange using Third Party System interfaced with System
17. Third Party performs Data Exchange using System file mover systems, including FTP
18. Third Party performs Data Exchange using System application programming interface (API)
19. Third Party System performs Data Exchange using System user interface
20. Third Party System performs Data Exchange by using email, SMS, instant messenger, fax, twitter or another type of messaging that is received by System 21. Third Party System performs Data Exchange using Device interfaced with System
22. Third Party System performs Data Exchange using Third Party System interfaced with System
23. Third Party System performs Data Exchange using System file mover systems, including FTP
24. Third Party System performs Data Exchange using System application programming interface (API)

Data Exchange Payment Data Method

Figure 8:
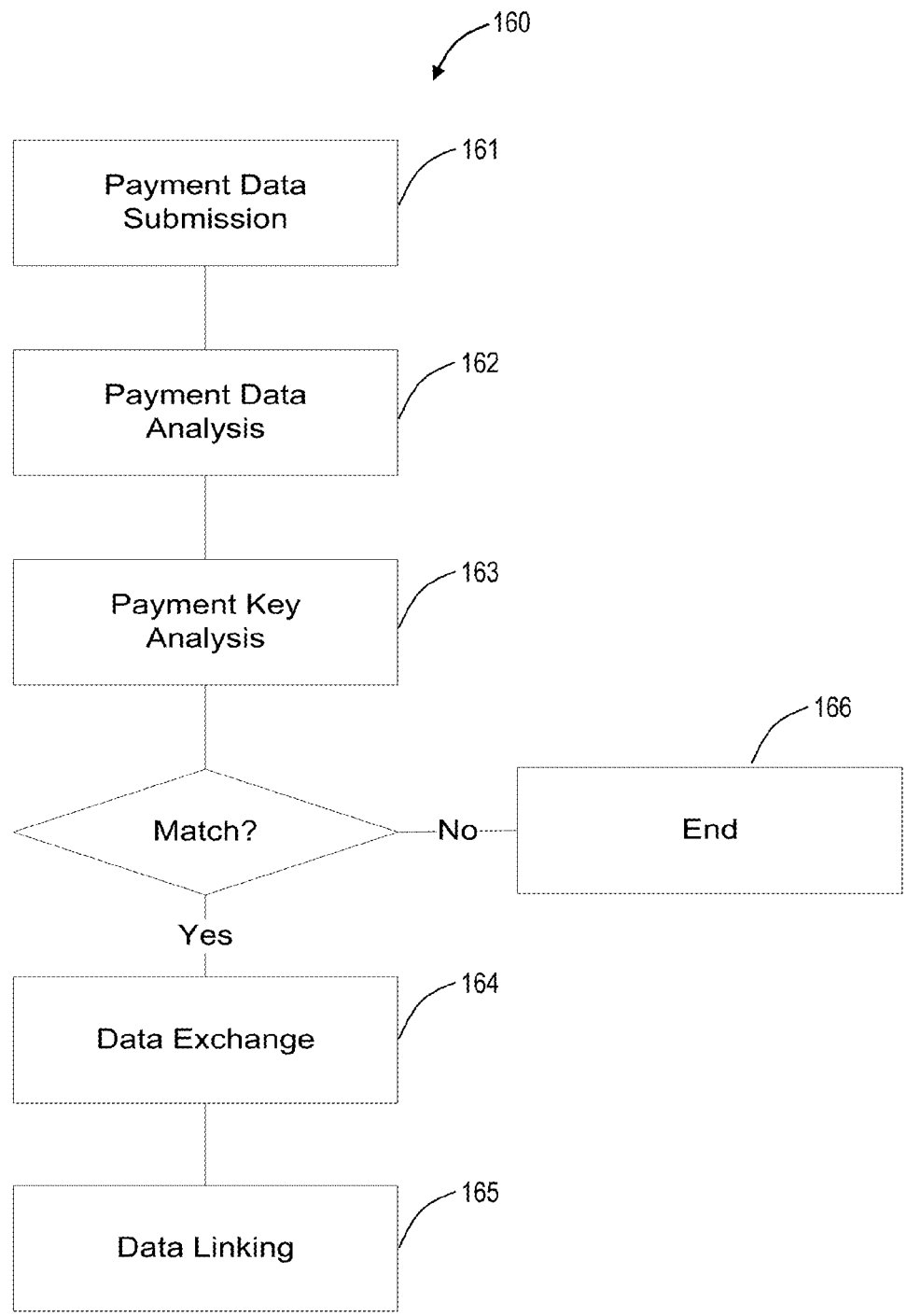
FIG. 8 is a flowchart of a payment data method.

Referring to FIG. 8, in an exemplary embodiment, a flowchart illustrates a payment data method 160. While Credentials may or may not be used to allow Payment Data Submission, the key difference with this method is that it uses the Payment Key to identify Company, Location and Device for Data Exchange versus relying on Credentials. For example, an Issuer may have Credentials to interface with the System but it doesn't have Credentials for Companies so, in order to link Payments with Companies, the Issuer would supply Payment Data to System, which would in turn identify the Companies, Locations, and Devices and then perform Data Exchange.

Payment Data Submission (step 161), the act of Payment Data being received by System, occurs. Next, Payment Data Analysis (step 162), the act of using Payment Data to identify associated Company, Payment Key and/or Account, occurs. Next, Payment Key Analysis (step 163), the act of comparing a Product Key received during Product Key Submission with Product Keys that exist in System to identify if there is a match, occurs. If the Payment Key received during Payment Data Submission exists within System, Data Exchange (step 164), the act of adding, inputting, outputting, editing, deleting, viewing, moving, copying, publishing, synchronizing and/or any other data manipulation of Content, as well as the use of optical character recognition (OCR) to extract machine readable data from human readable data, to and/or from System, occurs. Additionally, Data Linking (step 145), the act of utilizing one or more characters and/or one or more groups of one or more characters of Credential and/or Content to associate Content with one or more Accounts and/or associate Content with other Content, occurs. If the Payment Key received during Payment Data Submission does not exist within System, the operation ends (step 166) typically with an error to the entity submitting the Credentials.

Various exemplary embodiments are contemplated of the method 160 including, without limitation:
1. Company submits Payment Data gathered from web pages
2. Company submits Payment Data gathered from software application, including mobile and tablet applications
3. Company submits Payment Data gathered from digital Statements
4. Company submits Payment Data gathered from hardcopy Statements
5. Customer submits Payment Data gathered from web pages
6. Customer submits Payment Data gathered from software application, including mobile and tablet applications
7. Customer submits Payment Data gathered from digital Statements
8. Customer submits Payment Data gathered from hardcopy Statements
9. Third Party submits Payment Data gathered from web pages
10. Third Party submits Payment Data gathered from software application, including mobile and tablet applications
11. Third Party submits Payment Data gathered from digital Statements
12. Third Party submits Payment Data gathered from hardcopy Statements
13. Third Party System submits Payment Data gathered from web pages
14. Third Party System submits Payment Data gathered from software application, including mobile and tablet applications
15. Third Party System submits Payment Data gathered from digital Statements
16. Third Party System submits Payment Data gathered from hardcopy Statements Data Processing Once the System has performed Data Exchange, the System can perform certain actions on the data to create new data or other value. For instance, the data stored in or associated with the System (herein referred to as Content) can be used to calculate rewards for one or more customers and validate coupons. Further, the System can share Content with Third Parties and Third Party Systems to save Customers time by, for example, automatically registering Products with manufacturers. In summary, where Data Exchange focused on the input and output of data, Data Processing is related to all of the actions that can be taken on the data.

Data Processing: Enrichment Method

Figure 9:
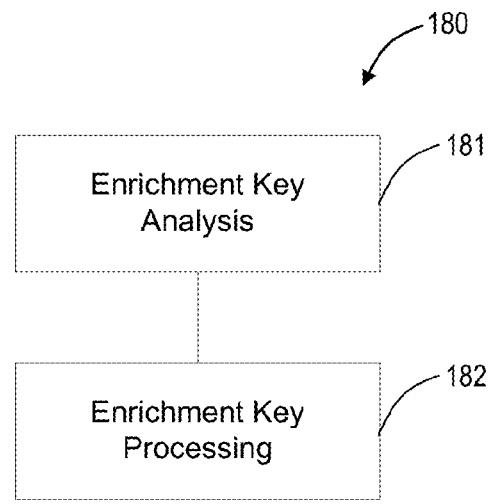
FIG. 9 is a flowchart of an enrichment method.

Referring to FIG. 9, in an exemplary embodiment, a flowchart illustrates an enrichment method 180. Because the Content is stored and/or accessible to the System, said Content can be enhanced when paired with additional data provided by or on behalf of System (herein referred to as Enrichment Data). Enrichment Data essentially enhances and expands existing Company data providing more value or by creating new data. For example, if a zip code is part of Company Data, Enrichment Data could be demographic information about that zip code region.

Enrichment Key Analysis (step 181), the act of identifying Enrichment Keys that exist in both Company Data and Enrichment Data, occurs. Next, Enrichment Key Processing (step 182), the act of associating Enrichment Data with Company Data using Enrichment Keys, occurs.

Figure 10:
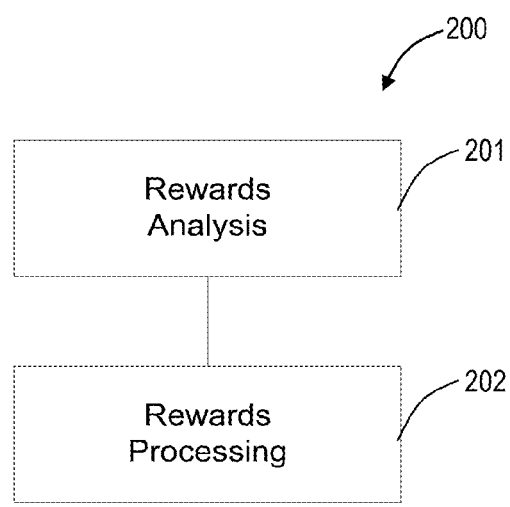
FIG. 10 is a flowchart of a reward method.

Various exemplary embodiments are contemplated of the method 180 including, without limitation:
1. System links Enrichment Data with Categories in Company Data
2. System links Enrichment Data with Contact Information in Company Data
3. System links Enrichment Data with Coupons in Company Data
4. System links Enrichment Data with Invoices in Company Data
5. System links Enrichment Data with Links in Company Data
6. System links Enrichment Data with Messages in Company Data
7. System links Enrichment Data with Menus in Company Data
8. System links Enrichment Data with Names in Company Data
9. System links Enrichment Data with Offers in Company Data
10. System links Enrichment Data with Product Data in Company Data
11. System links Enrichment Data with Purchase Orders in Company Data
12. System links Enrichment Data with Ratings in Company Data
13. System links Enrichment Data with Receipts in Company Data
14. System links Enrichment Data with Reviews in Company Data 15. System links Enrichment Data with Rewards Rules in Company Data
16. System links Enrichment Data with Schedules in Company Data
17. System links Enrichment Data with Surveys in Company Data
18. System links Enrichment Data with Transaction Data in Company Data
19. System links Enrichment Data with GTINs in Company Data Rewards Method Referring to FIG. 10, in an exemplary embodiment, a flowchart illustrates a reward method 200. The method 200 utilizes Content and Payment Data to calculate and optionally fulfill Rewards for one or more Customers. One advantage of the methods and systems is its ability to manage a universal Rewards program where Customers could earn Rewards whenever they engage in a Transaction with any Company that utilizes the System versus the traditional process where Rewards are accumulated on a Company by Company basis. Further Rewards can be calculated by aggregating Customer data such that a group of Customers could earn more rewards than a single Customer alone. As an example, the concept of a group or clique (or a group of Customers that are associated together in some way within the system) could allow a Company to increase its sales while allowing the Customers to earn additional Rewards by meeting the Rewards criteria jointly. Finally, Rewards can be fulfilled in a variety of ways. For example, a credit could be issued to a credit card used, or a check could be mailed for the Reward amount.

Rewards Analysis, (step 201), the act of identifying if any Reward Rules apply, occurs. Next, Rewards Processing (step 202), the act of calculating and/or fulfilling Rewards based on Reward Rules, occurs.

Figure 11:
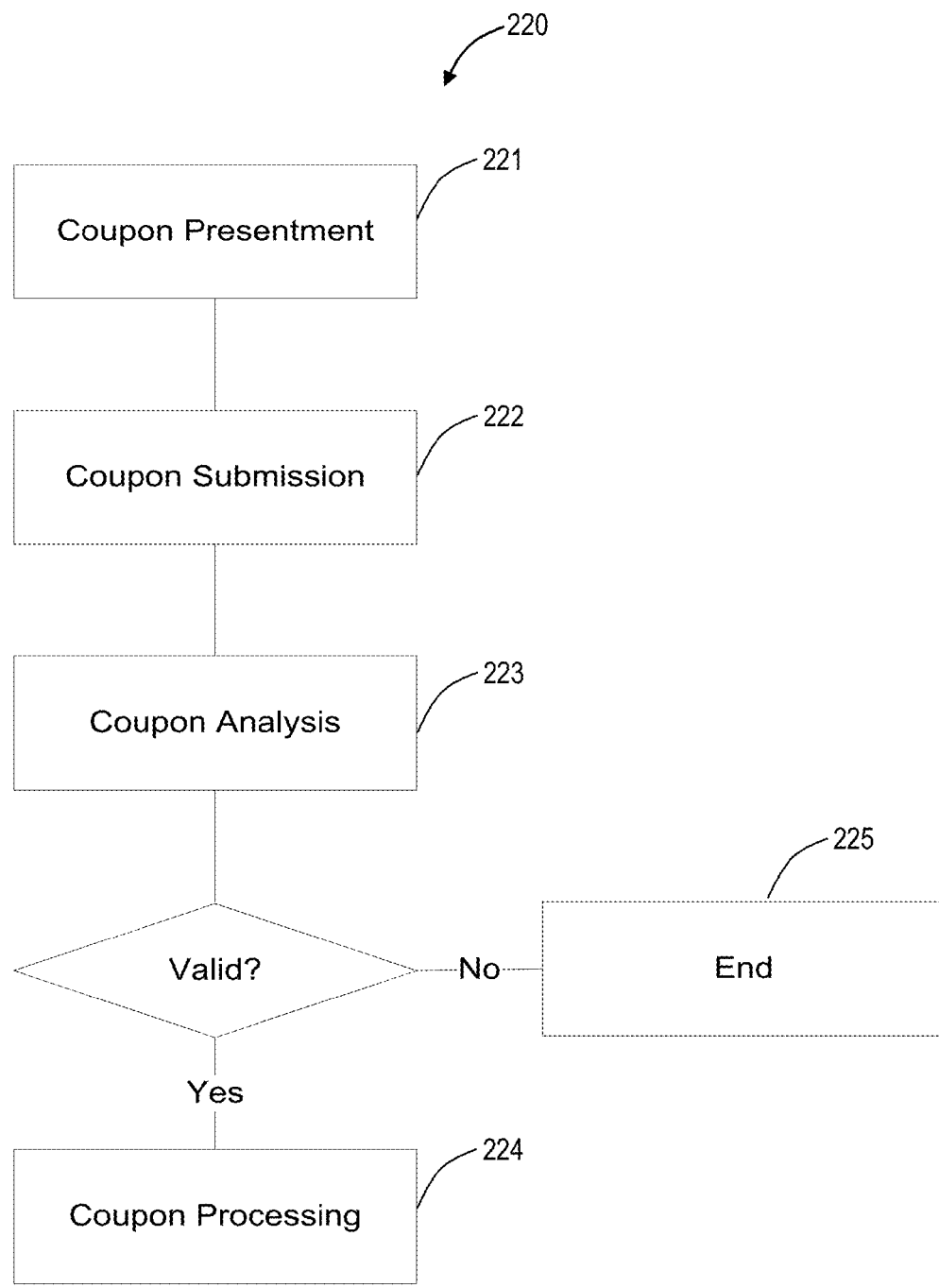
FIG. 11 is a flowchart of a coupon method.

Various exemplary embodiments are contemplated of the method 200 including, without limitation:
1. Reward Rules apply to one or more Companies and one or more Customers and are fulfilled by crediting the Customer's credit/debit card or other payment form/method
2. Reward Rules apply to one or more Companies and one or more Customers and are fulfilled by crediting the Customer's bank account
3. Reward Rules apply to one or more Companies and one or more Customers and are fulfilled by issuing the Customer a check
4. Reward Rules apply to one or more Companies and one or more Customers and are fulfilled by issuing the Customer a wire
5. Reward Rules apply to one or more Companies and one or more Customers and are fulfilled by issuing the Customer an automated clearing house (ACH)
6. Reward Rules apply to one or more Companies and one or more Customers and are fulfilled by issuing the Customer a person to person (P2P) payment
7. Reward Rules apply to one or more Companies and one or more Customers and are fulfilled by issuing the Customer more Rewards
8. Reward Rules apply to one or more Companies and one or more Customers and are fulfilled by issuing the Customer a Coupon
9. Reward Rules apply to one or more Companies and one or more Customers and are fulfilled by issuing the Customer a credit/debit card
10. Reward Rules apply to one or more Companies and one or more Customers and are fulfilled by providing the Customer products and/or services of any kind
11. Reward Rules apply to one or more Companies and one or more Customers and are fulfilled by issuing the Customer currency Coupon Method Referring to FIG. 11, in an exemplary embodiment, a flowchart illustrates a coupon method 220. One advantages of the System is its ability to allow Companies to set thresholds for Coupons which are calculated after each Coupon Validation is done. For instance, maybe a Company would like to offer 10% off everything in the store but is only willing to fund up to $500, or maybe the same Company only wants to offer redemptions for the first ten Customers. Once the System validates the Coupon (step 223), it can then lower the count available based on the criteria. Further, another advantage of the System is that the Coupon Submission can be handled in a variety of ways from SMS to a phone call. If the coupon is not valid (step 224), the method 220 ends (step 225), otherwise coupon processing is performed (step 226).

Coupon Presentment (step 221), the act of presenting a Coupon to a Company, occurs. Next, Coupon Submission (step 222), the act of Coupon ID being received by System, occurs. Next, Coupon Analysis (step 223), the act of comparing a Coupon ID received during Coupon Submission with Coupon IDs that exist is System to identify if there is a match, occurs. If the Coupon ID received during Coupon Submission exists within System, Coupon Processing (step 224), the act of providing approval or decline for Coupon redemption and, based on approval or decline, adjusting the coupon counts and/or other associated data, occurs. As mentioned above, this step can include reduces the number of Coupons left for redemption. If the Coupon ID received during Coupon Submission does not exist in the System, the process would end (step 225) and could provide an error.

Various exemplary embodiments are contemplated of the method 220 including, without limitation:
1. Coupon Present is done using System user interface
2. Coupon Present is done using email, SMS, instant messenger, fax, twitter or another type of messaging that is received by System
3. Coupon Present is done using Device interfaced with System
4. Coupon Present is done using Third Party System interfaced with System
5. Coupon Present is done using System file mover systems, including FTP
6. Coupon Present is done using System application programming interface (API)

Sharing Method

Figure 12:
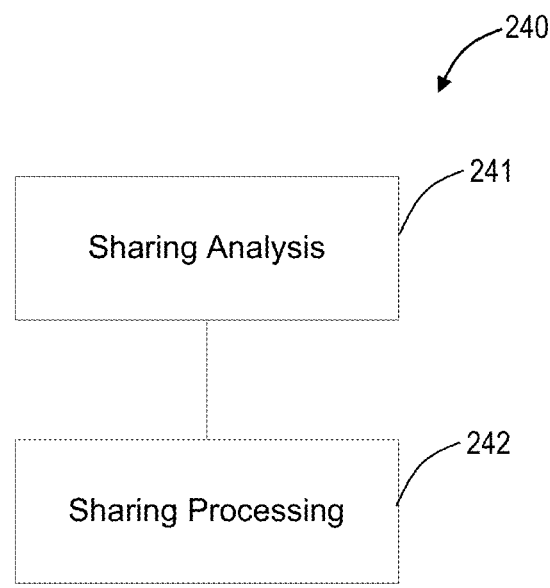
FIG. 12 is a flowchart of a sharing method.

Referring to FIG. 12, in an exemplary embodiment, a flowchart illustrates a sharing method 240. The method 240 allows Content to be shared with Third Parties and Third Party Systems based on Sharing Rules. This allows the Content to be used in useful and unique ways. For instance, the System could automatically register products with manufacturers when the Product Keys or GTINs are identified on a receipt. Or the Company Data could be shared with social networks, such as Facebook and the like, allowing the Company to enter information once and have it distributed through multiple channels.

Sharing Analysis (step 241), the act of identifying if any Sharing Rules apply, occurs. Next, Sharing Processing (step 242), the act of sharing Content and/or Payment Data based on Sharing Rules, occurs.

Figure 13:
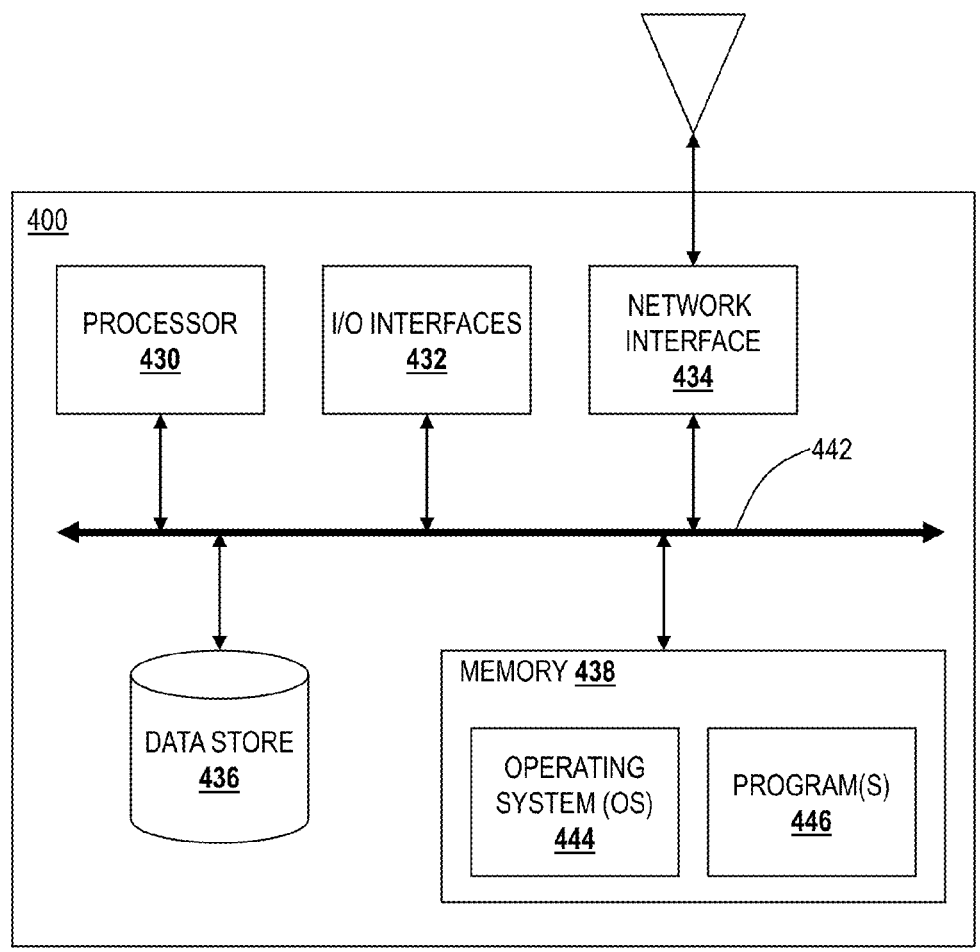
FIG. 13 is a block diagram of a smart device for use in the various systems and methods described herein.

Various exemplary embodiments are contemplated of the method 240 including, without limitation:
1. Sharing Processing shares data with other Companies
2. Sharing Processing shares data with Customers 3. Sharing Processing shares data with Third Parties
4. Sharing Processing shares data with Third Party Systems Referring to FIG. 13, in an exemplary embodiment, a block diagram illustrates a smart device 400 for use in the various systems and methods described herein. The smart device 400 can be a digital device that, in terms of hardware architecture, generally includes a processor 430, input/output (I/O) interfaces 432, a network interface 434, a data store 436, and memory 438. It should be appreciated by those of ordinary skill in the art that FIG. 13 depicts the smart device 400 in an oversimplified manner, and a practical embodiment can include additional components and suitably configured processing logic to support known or conventional operating features that are not described in detail herein. The components (430, 432, 434, 436, 438) are communicatively coupled via a local interface 442. The local interface 442 can be, for example but not limited to, one or more buses or other wired or wireless connections, as is known in the art. The local interface 442 can have additional elements, which are omitted for simplicity, such as controllers, buffers (caches), drivers, repeaters, and receivers, among many others, to enable communications. Further, the local interface 442 may include address, control, and/or data connections to enable appropriate communications among the aforementioned components.

The processor 430 is a hardware device for executing software instructions. The processor 430 can be any custom made or commercially available processor, a central processing unit (CPU), an auxiliary processor among several processors associated with the smart device 400, a semiconductor-based microprocessor (in the form of a microchip or chip set), or generally any device for executing software instructions. When the smart device 400 is in operation, the processor 430 is configured to execute software stored within the memory 438, to communicate data to and from the memory 438, and to generally control operations of the smart device 400 pursuant to the software instructions. In an exemplary embodiment, the processor 430 may include a mobile optimized processor such as optimized for power consumption and mobile applications.

The I/O interfaces 432 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, wearable display devices such as armband or shoulder mounted device, an earpiece or headphones, glasses with a virtualized display included therein, and the like. The I/O interfaces 432 can also include, for example, a serial port, a parallel port, a small computer system interface (SCSI), an infrared (IR) interface, a radio frequency (RF) interface, a universal serial bus (USB) interface, proprietary vendor interconnects (e.g., 30 pin adapter, 19 pin adapter, etc.), an audio jack, and the like. The I/O interfaces 432 can include a graphical user interface (GUI) that enables a user to interact with the smart device 400 Additionally, the I/O interfaces 342 may further include an imaging device, i.e. camera, video camera, etc., location device such as GPS, etc.

The network interface 434 enables wireless communication to an external access device or network, such as to a wireless access device. Any number of suitable wireless data communication protocols, techniques, or methodologies can be supported by the network interface 434, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 436 can be used to store data. The data store 436 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 436 can incorporate electronic, magnetic, optical, and/or other types of storage media. The memory 348 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 438 may incorporate electronic, magnetic, optical, and/or other types of storage media. Note that the memory 438 can have a distributed architecture, where various components are situated remotely from one another, but can be accessed by the processor 30.

The software in memory 438 can include one or more software programs, each of which includes an ordered listing of executable instructions for implementing logical functions. In the example of FIG. 13, the software in the memory system 438 includes a suitable operating system (O/S) 444 and programs 446. The operating system 444 essentially controls the execution of other computer programs, and provides scheduling, input-output control, file and data management, memory management, and communication control and related services. The programs 446 can include various applications, add-ons, etc. configured to provide end user functionality with the smart device 400. For example, exemplary programs 446 can include, but not limited to, a web browser, social networking applications, streaming media applications, games, mapping and location applications, electronic mail applications, financial applications, and the like.

In an exemplary embodiment, the programs 446 include instructions that, when executed, cause the processor to implement the channel 30 via an overlaid software component, e.g. a browser plugin and the like, that identifies transactions based on the payment key utilizing the methods described herein. Once transactions are identified, the other various methods can be implemented as described herein with respect to the channel 30. Further, while the smart device 400 is described in the context of a mobile device, the smart device 400 could also be a desktop, laptop, tablet, could service etc or similar device, concept or platform.

Figure 14:
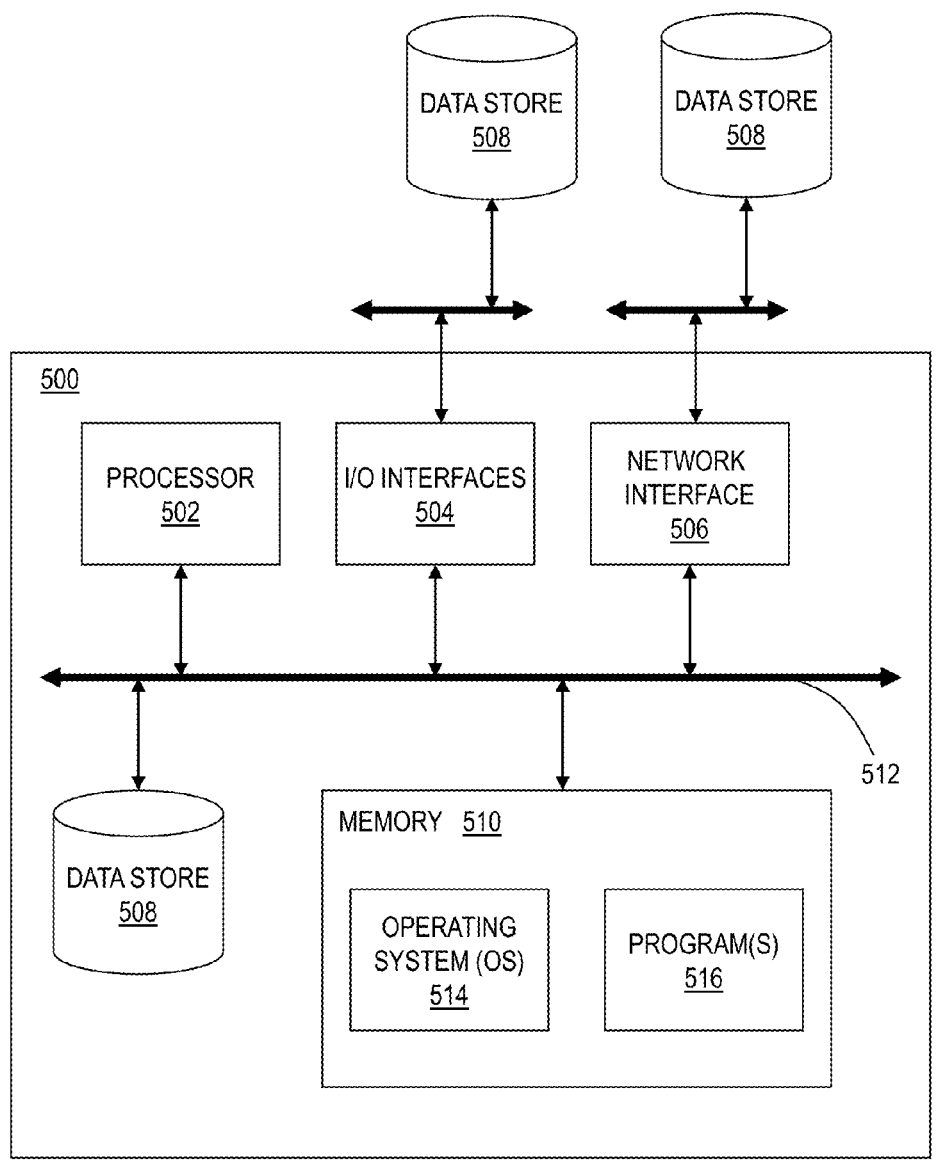
FIG. 14 is a block diagram of an exemplary implementation of a server for use in the various methods described herein.

Referring to FIG. 14, in an exemplary embodiment, a block diagram illustrates an exemplary implementation of a server 500 for use in the various methods described herein. The server 500 can be a digital computer that, in terms of hardware architecture, generally includes a processor 502, input/output (I/O) interfaces 504, a network interface 506, a data store 508, and memory 510. It should be appreciated by those of ordinary skill in the art that FIG. 14 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 can be, for example but not limited to, one or more buses or other wired or wireless connections, as is known in the art. The local interface 512 can have additional elements, which are omitted for simplicity, such as controllers, buffers (caches), drivers, repeaters, and receivers, among many others, to enable communications. Further, the local interface 512 can include address, control, and/or data connections to enable appropriate communications among the aforementioned components.

The processor 502 is a hardware device for executing software instructions. The processor 502 can be any custom made or commercially available processor, a central processing unit (CPU), an auxiliary processor among several processors associated with the server 500, a semiconductor-based microprocessor (in the form of a microchip or chip set), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 can be used to receive user input from and/or for providing system output to one or more devices or components. User input can be provided via, for example, a keyboard, touch pad, and/or a mouse. System output can be provided via a display device and a printer (not shown). I/O interfaces 504 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 506 can be used to enable the server 500 to communicate on a network, such as to communicate with the smart device 400. The network interface 506 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 506 can include address, control, and/or data connections to enable appropriate communications on the network. A data store 508 can be used to store data. The data store 508 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 can incorporate electronic, magnetic, optical, and/or other types of storage media. In one example, the data store 508 can be located internal to the server 500 such as, for example, an internal hard drive connected to the local interface 512 in the server 500. Additionally in another embodiment, the data store 508 can be located external to the server 500 such as, for example, an external hard drive connected to the I/O interfaces 104 (e.g., SCSI or USB connection). In a further embodiment, the data store 508 can be connected to the server 500 through a network, such as, for example, a network attached file server.

The memory 510 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 can incorporate electronic, magnetic, optical, and/or other types of storage media. Note that the memory 510 can have a distributed architecture, where various components are situated remotely from one another, but can be accessed by the processor 502. The software in memory 510 can include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

In an exemplary embodiment, the server 500 is configured to execute a system implementing the various methods described herein. For example, the server 500 can be a web server or the like that maintains the channel 30 enabling the companies and customers to interact based on the payment keys from the transaction 40.

In an exemplary embodiment, the server 500 can be part of one or more devices in the cloud offering services to customers and companies to create the channel 30. For example, the server 500 can be a centralized repository of information for the channel 30. The customers can have applications on their devices, i.e. the devices 400, such as a browser plug-in that can identify transactions 40 using the Payment Keys and provide access to the channel 30 which is hosted in the cloud and/or on the server 500. The company can interact with the channel 30 through the server 500, providing virtually any type of information to the customer. The customer can activate the channel once the application on their device determines a transaction 40 is associated with the channel 30. For example, assume the customer is viewing transaction data online, e.g. on a website, in a software package, etc., the application can provide some indicia that a particular transaction is part of the channel 30. For example, in a website, the browser plug-in could display an icon over the transaction. The user could click on or over the icon and information could be displayed in the channel 30, i.e. a pop-up, a menu, a click-through, etc.

Figure 15A:
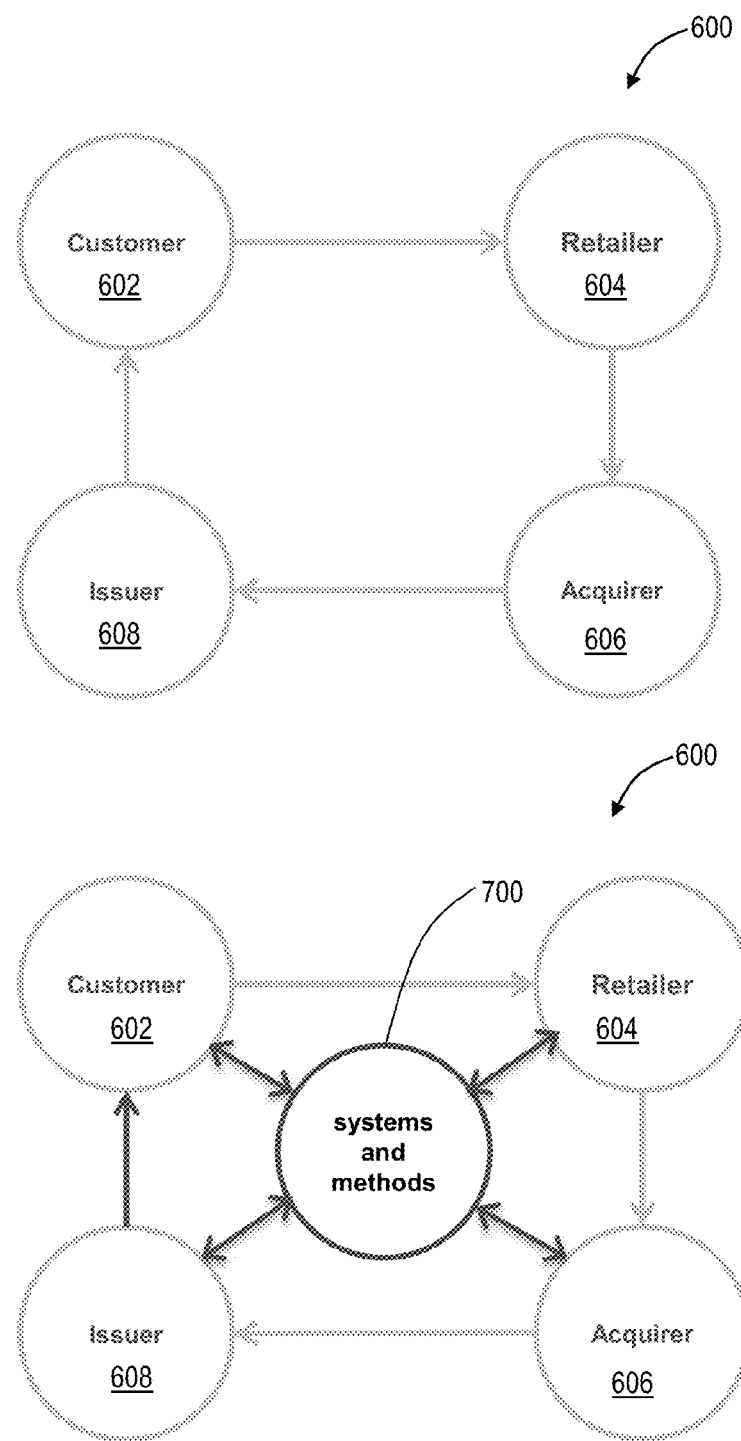
FIG. 15A is a diagram of a conventional payment system compared to a payment system using the engagement channel and how the invention overlays these systems.

Referring to FIG. 15A, in an exemplary embodiment, a payment network 600 is illustrated showing an overlaid system 700 implementing the systems and methods described herein to offer the channel 30 on the existing payment network 600. The payment network 600 includes a customer 602 making a purchase from a retailer 604 which sends the data to an acquirer 606 which sends the data to an issuer 608. As described herein, transaction and/or payment data flows between these entities 602, 604, 606, 608. Of course, legal monetary exchange also occurs whereby the retailer 604 receives payment for the goods or services from the customer 602 through the acquirer 606 and the issuer 608. Note, those of ordinary skill in the art will recognize the payment network 600 is shown for illustration purposes and any number of different architectures could be used. Further, while referred to a customer 602 and retailer 604, these entities could be payor, payee, merchant, company, etc. Of note, there is payment data that is provided through the payment network 600 in addition to value exchange. It is via this payment data that the systems and methods enable the channel 30 between the customer 602 and the retailer 604.

The overlaid system 700 implements the various systems and methods described herein with respect to the channel 30 and the associated methods. Of note, the overlaid system 700 sits on or is in addition to the existing payment network 600. There is no requirement to modify the existing payment network 600 which is a key advantage to leverage the channel 30. The overlaid system 700 can be formed by one or more servers, such as the server 500, as well as one or more devices, such as the smart devices 400. That is, the overlaid system 700 can be a server for interfacing with the merchants, retailers, etc. for defining payment keys and the like. The overlaid system 700 can further be client-side devices for users to identify transactions that match the payment key to open up the associated channel 30. The overlaid system 700 is not necessarily tied to the issuer 608 or the acquirer 606. Rather, the overlaid system 700 can interoperate with all issuers or acquires thus expanding the usefulness and scope of the channel 30. As such, the overlaid system 700 focuses on interoperating with existing payment networks within associated confines related to static data as well as being able to operate across many different payment networks concurrently.

Figure 15B:
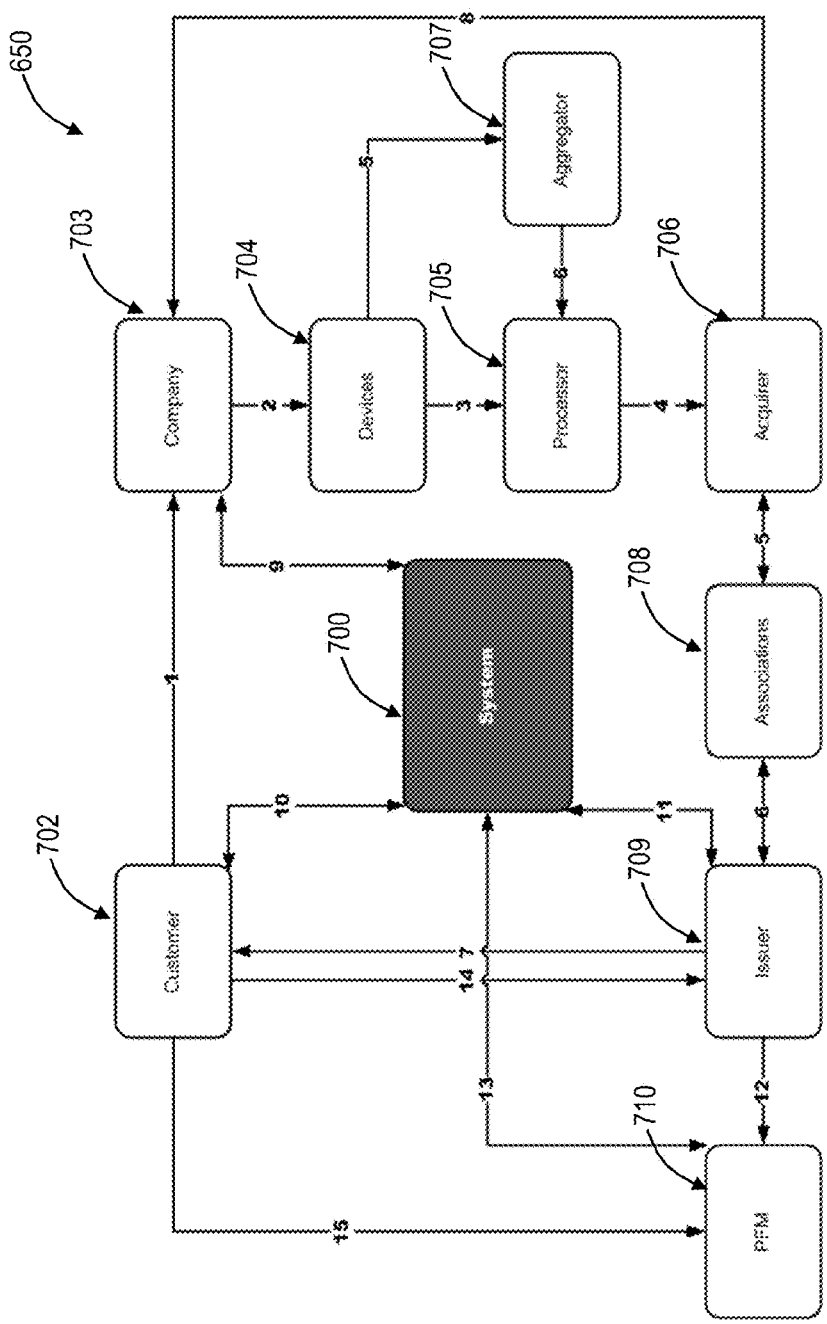
FIG. 15B is a flow diagram of an exemplary method using the overlaid system.

Referring to FIG. 15B, in an exemplary embodiment, a flow diagram illustrates an exemplary method 650 using the overlaid system 700. Customer 702 makes Payment to Company 703 (step 1), which enters Payment into Device (step 2). Device 704 then transmits Payment to Processor 705 (step 3). Alternatively, Company 703 could utilize Device 704 to transmit Payment to Aggregator 707 (step 5), which in turn transmits the Payment to Processor 705 (step 6). The Processor 705 then transmits Payment to Acquirer 706 (step 4) which interacts with Issuer 709 through Associations 708 (steps 5 & 6). The Issuer 709 then debits the Customer 702 (step 7) and the Acquirer 706 credits the Company 703 (step 8). This completes Payment Processing. Next, Company 703 populates System 700 with Company Data (step 9). In avoidance of doubt the Company Data and other Content can be provided to System 700 from any authorized entity or system in the process, including Devices, which could transmits Transaction Data for example. The Customer 702 can receive the content published by Company 703 or Third Parties or Third Party Systems, in three primary ways based on this example. First, the Customer 702 could use local software, such as browser extension, to transmit Payment data to System 701 (step 10) to match Company 703 and display Company Data. Second, Issuer 709 could transmit Payment Data to System 701 (step 11) to match Company 703 and display Company data when Customer views Payment Data provided by Issuer 709 via paper or online statement (step 14). Third, PFM 710 can gather Payment Data from Issuer 709 (step 12), then transmit Payment Data to System 700 (step 13) to match Company 703 and display Company data when Customer 702 views Payment Data Customer views Payment Data provided by PFM 710 via paper or online statement (step 15).

Figure 16A:
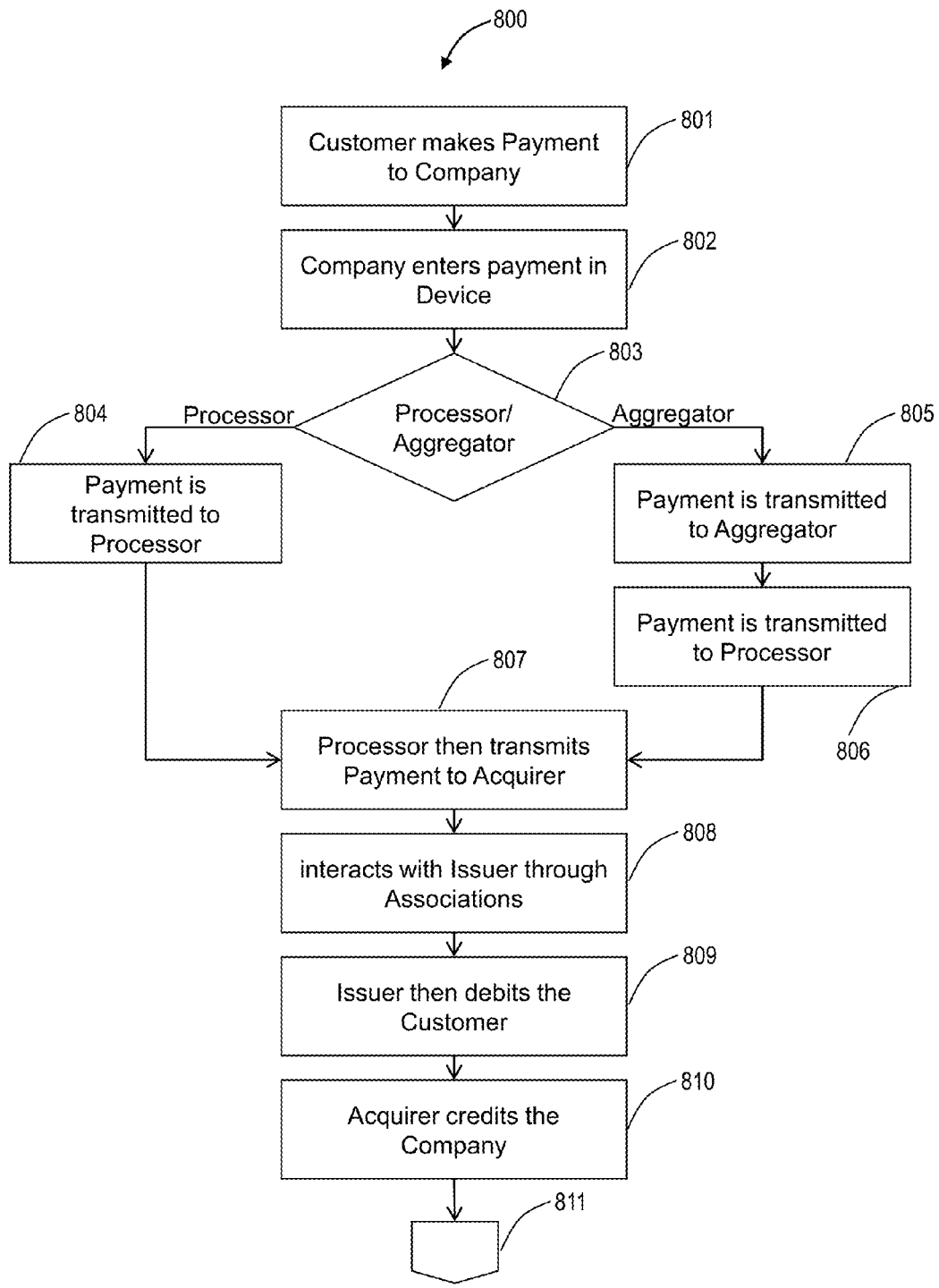
FIGS. 16A-16B are flowcharts of a payment method.
Figure 16B:
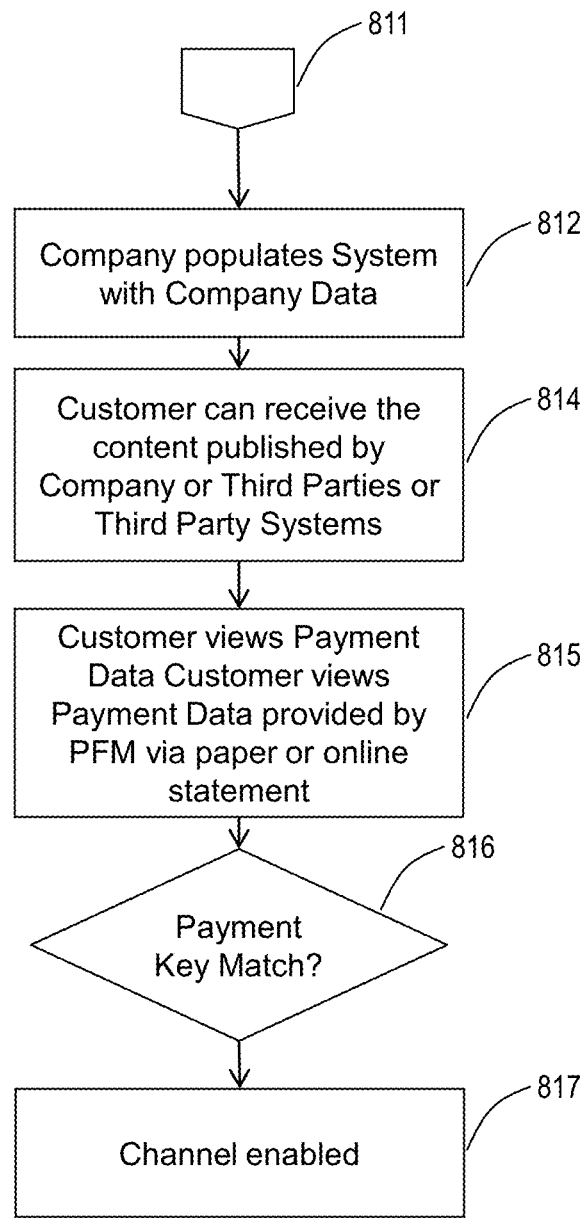

Referring to FIGS. 16A-16B, in an exemplary embodiment, a flowchart illustrates an exemplary payment method 800. A Customer makes a Payment to a Company (step 801), which enters the Payment into a Device (step 802). For example, the Device could be, without limitation, a point-of-sale (POS) device, a credit/debit card reader, a near-field communication device, a cash register, an online payment site, and the like. The exemplary method 800 can use a processor or aggregator (step 803). The Device can transmit the Payment to a Processor (step 804). Alternatively, the Company could utilize the Device to transmit the Payment to an Aggregator (step 805), which in turn transmits the Payment to the Processor (step 806). The Processor then transmits the Payment to an Acquirer (step 807) which interacts with an Issuer through Associations (step 808). The Issuer then debits the Customer (step 809) and the Acquirer credits the Company (step 810). This completes Payment Processing (step 811). Next, the Company populates a System with Company Data (step 812). In avoidance of doubt, the Company Data and other Content can be provided to the System from any authorized entity or system in the process, including Devices, which could transmit Transaction Data for example. The Customer can receive the Payment Data three primary ways based on this example but other ways or methods are contemplated (step 815). First, the Customer could use local software, such as browser extension, to transmit Payment Data to the System to match Company and display Company Data. Second, the Issuer could transmit Payment Data to the System to match the Company and display Company Data when Customer views Payment Data provided by the Issuer via paper or online statement. Third, A PFM can gather Payment Data from the Issuer, then transmit Payment Data to the System to match the Company and display Company Data when Customer views Payment Data Customer views Payment Data provided by the PFM via paper or online statement. When viewing the Payment Data, if there is a Payment Key match (step 816), the channel can be enabled (step 817).

Figure 17:
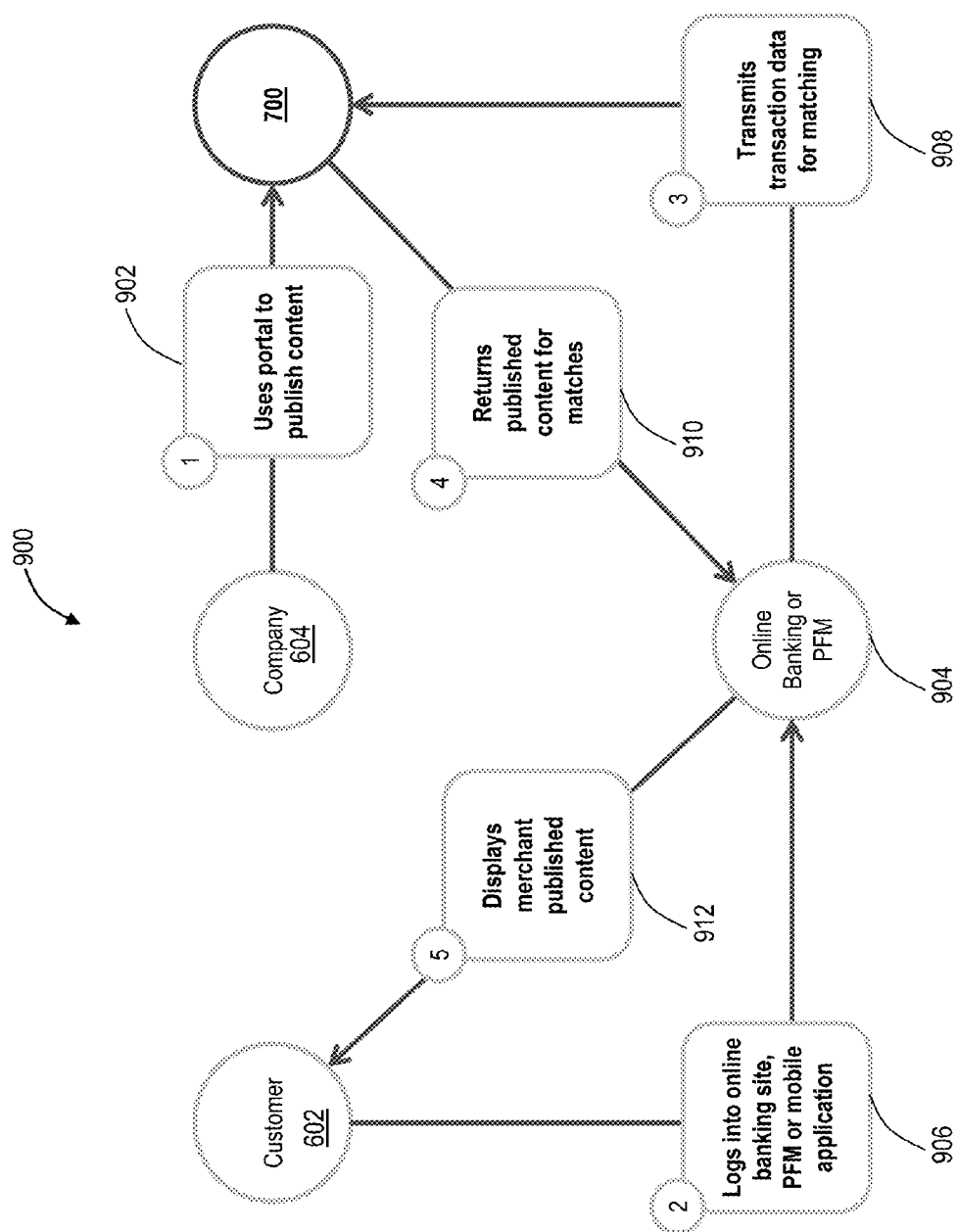
FIG. 17 is a flow diagram of a channel method.
Figure 18:
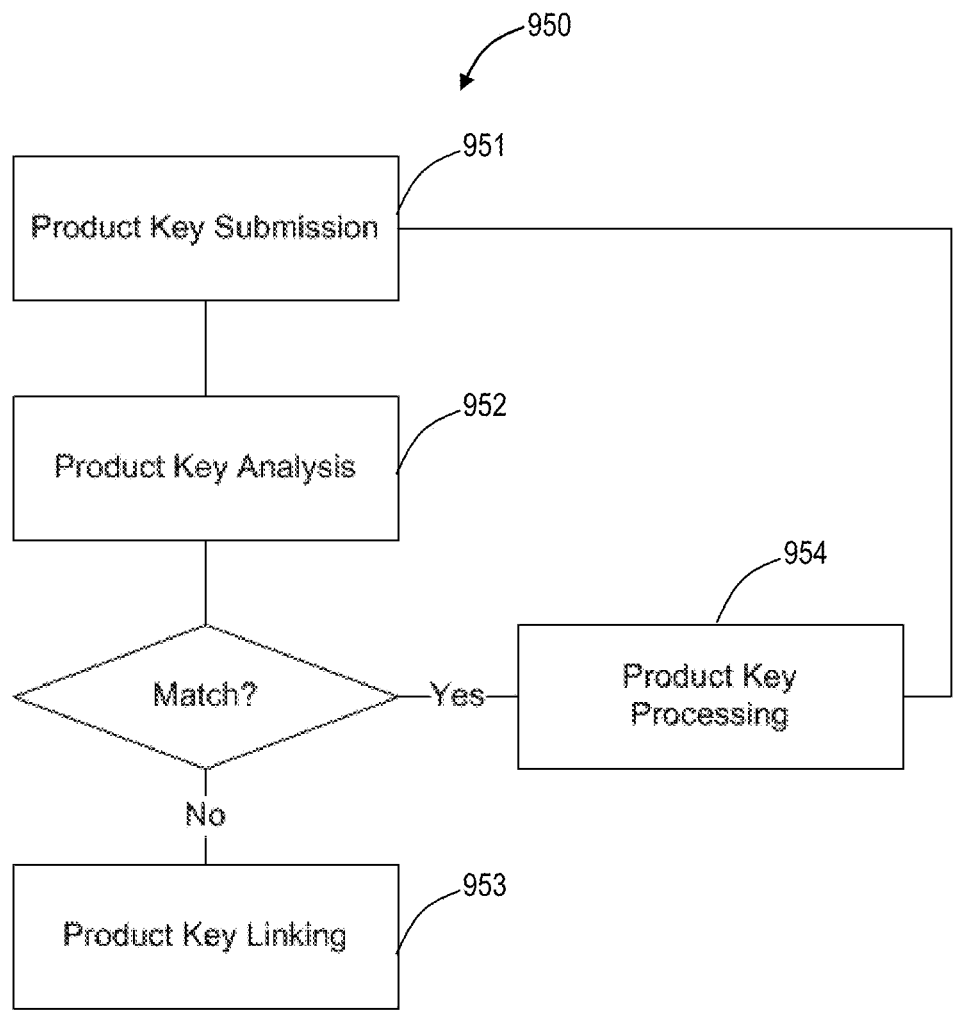
FIG. 18 is a flowchart of the product key method.

Referring to FIG. 17, in an exemplary embodiment, a flow diagram illustrates a channel method 900. First, a Company 604 publishes content to the overlaid system 700 (step 902). This content can be anything enabled by the channel 30 as described herein. Next, a customer 602 logs into an online banking site 904, a personal finance manager (PFM) site, a mobile application, etc. (step 906). Payment/transaction data is transmitted from the site 904 to the overlaid system 700 for matching (step 908), and upon matching, the overlaid system 700 returns published content for the matches (step 910). The published content is displayed to the customer 602 (step 912).

While the systems and methods utilize known values that do not need to match a business name, the Payment Key (i.e., the combination of all static field values) can appear in different places within the payment data on an issuer by issuer basis. Therefore, in addition to its unique approach and systems for matching the merchants, the system also employs logic to find the matching value within a set of data. Typically it can be done with a wild card search.

In addition, while the system can rely on multiple data fields, not just the merchant name field, some fields can be truncated by the issuer. Therefore, the system could employ logic to identify probability of a match based on the number of fields matched and the number of characters within the field matched. Again the values are irrelevant and have not to do with the probability . . . it is simply a probability based on the number of characters of a Payment Key present in the payment data. While the system will likely not accept anything less than a 100% probability match, the present inventions allows for and contemplates the case of a less than 100% match.

As described herein, conventional systems and methods have constraints in being able to accurately identify individual merchants and locations relying on narrow merchant name data solely. Advantageously, the systems and methods described herein do not require even a portion of the merchant's business name to be able to identify the merchant from a specified set of transaction data. This novel aspect is a driving factor in enabling creation of the channel 30 since every the transaction data can be completely and accurately correlated to a specific merchant and location. Furthermore, the systems and methods described herein are able to not only identify the merchant and location but also the specific device that was involved in the transaction.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A computer-implemented method, comprising:
    determining a payment key associated with a specific company, wherein the payment key comprises one or more attributes of payment data, company payment data, or merchant data, either in a native form or in a derivative form, that is configured to uniquely identify the specific company;
    determining payment data matches the payment key thereby indicating a customer had a transaction with the specific company;
    creating an engagement channel between the customer and the specific company based on the matching of the payment data and the payment key;
    receiving data from the specific company, wherein the data comprises information for to the customer who has not registered with the specific company but has at least one transaction therewith; and
    providing the data to the customer by the specific company through the engagement channel for display thereof, wherein the data comprises one of data related to a transaction associated with the payment data and/or data related to a future transaction;
    wherein the payment data is matched to the payment key without a contemporaneous request by the customer to do so during the transaction, and wherein the determining, creating, receiving, and providing steps are performed by a processor communicatively coupled to memory and a network interface.

2. The computer-implemented method of claim 1, wherein the payment key is derived using a plurality of static fields associated with a payment system including a merchant name field and at least one additional field such that the specific company is uniquely identifiable even if a merchant name is duplicative or incomplete.

3. The computer-implemented method of claim 1, wherein the determining the payment key comprises:
    providing the specific company a payment mechanism with known characteristics;
    performing a sample transaction using the payment mechanism and a known value;
    analyzing payment data associated with the sample transaction;
    deriving the payment key based on the known characteristics, the known value, and associated static data in the payment data; and
    linking the payment key to the specific company.

4. The computer-implemented method of claim 3, wherein if the derived payment key is duplicative of another specific company, the determining the payment key further comprises:
    determining a plurality of static fields for the specific company, wherein the plurality of static fields are used in payment data for the specific company;
    adjusting one or more of the plurality of static fields;
    deriving the payment key from the plurality of static fields, wherein the payment key is no longer duplicative of the another specific company based on the adjusting; and
    linking the payment key to the specific company.

5. The computer-implemented method of claim 1, wherein the determining the payment key comprises:
    determining a plurality of static fields for the specific company, wherein the plurality of static fields are used in payment data for the specific company;
    deriving the payment key from the plurality of static fields; and
    linking the payment key to the specific company.

6. The computer-implemented method of claim 1, further comprising:
    installing an application or browser add-in on a device associated with the customer;
    viewing the payment data on the device by the customer; and
    displaying indicia of the engagement channel on the device responsive to the determining the payment data matches the payment key.

7. The computer-implemented method of claim 1, further comprising:
    analyzing transaction data to determine a product associated with the transaction data; and
    providing the data through the engagement channel related to the product, wherein the data comprises any of receipt data and product manuals.

8. The computer-implemented method of claim 7, further comprising: determining the product during the determining the payment key.

9. The computer-implemented method of claim 1, wherein the data is provided to the customer by the specific company via the engagement channel without the specific company having a prior knowledge of the customer.

10. A server, comprising:
    a network interface communicatively coupled to at least one customer and at least one company;
    a processor communicatively coupled to the network interface; and
    memory storing instructions that, when executed, cause the processor to:
        register a specific company;
        derive a payment key associated with the specific company, wherein the payment key comprises one or more attributes of payment data, company payment data, or merchant data, either in a native form or in a derivative form, that is configured to uniquely identify the specific company;

determine payment data matches the payment key thereby indicating the customer had a transaction with the specific company;

create an engagement channel between the customer and the specific company based on the matching of the payment data and the payment key;

receive data from the specific company, wherein the data comprises information for the customer who has not registered with the specific company but has at least one transaction therewith; and provide the data to the customer by the specific company through the engagement channel for display thereof, wherein the data comprises one of data related to a transaction associated with the payment data and or data related to a future transaction;

wherein the payment data is matched to the payment key without a contemporaneous request by the customer to do so during the transaction.

11. The server of claim 10, wherein the payment key is derived using a plurality of static fields associated with a payment system including a merchant name field and at least one additional field such that the specific company is uniquely identifiable even if a merchant name is duplicative or incomplete.

12. The server of claim 10, wherein, to determine the payment key, the instructions, when executed, further cause the processor to:

provide the specific company a payment mechanism with known characteristics;

receive a sample transaction using the payment mechanism and a known value;

analyze payment data associated with the sample transaction;

derive the payment key based on the known characteristics, the known value, and associated static data in the payment data; and link the payment key to the specific company.

13. The server of claim 10, wherein, to determine the payment key, the instructions, when executed, further cause the processor to:

determine a plurality of static fields for the specific company, wherein the plurality of static fields are used in payment data for the specific company;

derive the payment key from the plurality of static fields; and link the payment key to the specific company.

14. The server of claim 10, wherein the data is provided to the customer by the specific company via the engagement channel without the specific company having a prior knowledge of the customer.

15. A computer, comprising:

a network interface communicatively coupled to a server on a network;

a processor communicatively coupled to the network interface; and memory storing instructions that, when executed, cause the processor to:

execute an application or browser add-in;

display payment data associated with a transaction between a customer and a specific company;

match the payment data to a predetermined payment key, wherein the predetermined payment key comprises one or more attributes of payment data, company payment data, or merchant data, either in a native form or in a derivative form, that is configured to uniquely identify the specific company;

display an engagement channel between the specific company and the customer; and provide data to the customer from the specific company through the engagement channel, wherein the data comprises one of data related to a transaction associated with the payment data and data related to a future transaction, wherein the data comprises information for the customer who has not registered with the specific company but has at least one transaction therewith;

wherein the payment data is matched to the payment key without a contemporaneous request by the customer to do so during the transaction.

16. The computer of claim 15, wherein the payment key is derived using a plurality of static fields associated with a payment system including a merchant name field and at least one additional field such that the specific company is uniquely identifiable even if a merchant name is duplicative or incomplete.

17. The computer of claim 15, wherein the data is provided to the customer by the specific company via the engagement channel without the specific company having prior knowledge of the customer.

* * * * *